United States Patent
Sugita

(10) Patent No.: US 10,955,729 B2
(45) Date of Patent: Mar. 23, 2021

(54) IMAGING APPARATUS, INTERCHANGEABLE LENS, INTERMEDIATE ACCESSORY, AND CONTROL METHODS THEREFOR

(71) Applicant: CANON KABUSHIKI KAISHA, Tokyo (JP)

(72) Inventor: Atsushi Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/450,552

(22) Filed: Jun. 24, 2019

(65) Prior Publication Data

US 2020/0004112 A1    Jan. 2, 2020

(30) Foreign Application Priority Data

Jun. 28, 2018 (JP) .............................. JP2018-123744

(51) Int. Cl.
| | |
|---|---|
| *G03B 17/14* | (2006.01) |
| *H04N 5/225* | (2006.01) |
| *H04N 5/232* | (2006.01) |
| *H04N 5/38* | (2006.01) |

(52) U.S. Cl.
CPC ........... *G03B 17/14* (2013.01); *H04N 5/2254* (2013.01); *H04N 5/23229* (2013.01); *H04N 5/38* (2013.01)

(58) Field of Classification Search
None
See application file for complete search history.

(56) References Cited

U.S. PATENT DOCUMENTS

| | | | | |
|---|---|---|---|---|
| 2012/0033955 | A1* | 2/2012 | Okada .................. | G03B 17/565 396/71 |
| 2017/0235214 | A1* | 8/2017 | Seki ....................... | G03B 17/14 396/529 |
| 2018/0224722 | A1* | 8/2018 | Pan ......................... | G03B 17/14 |
| 2018/0348475 | A1* | 12/2018 | Sugiyama .......... | H04N 5/23248 |
| 2020/0004112 | A1* | 1/2020 | Sugita ................ | H04N 5/23258 |
| 2020/0007739 | A1* | 1/2020 | Sugiyama .......... | H04N 5/23209 |

(Continued)

FOREIGN PATENT DOCUMENTS

| | | |
|---|---|---|
| JP | 2011-197094 A | 10/2011 |
| JP | 2017-146421 A | 8/2017 |

*Primary Examiner* — William B Perkey
(74) *Attorney, Agent, or Firm* — Canon U.S.A., Inc. IP Division

(57) ABSTRACT

An imaging apparatus to which an interchangeable lens and an intermediate accessory, which is attachable between the interchangeable lens and the imaging apparatus, are attachable, the imaging apparatus including at least one processor which functions as: a first communication control unit configured to control a first communication via a first communication path; a second communication control unit configured to control a second communication via a second communication path; and a setting unit configured to set an update target of control software. When the interchangeable lens is set as the update target, the first communication control unit transmits update data to be applied to the interchangeable lens via the first communication path to the interchangeable lens, and when the intermediate accessory is set as the update target, the second communication control unit transmits update data to be applied to the intermediate accessory via the second communication path to the interchangeable lens.

18 Claims, 20 Drawing Sheets

(56) References Cited

U.S. PATENT DOCUMENTS

| | | | |
|---|---|---|---|
| 2020/0007740 A1* | 1/2020 | Sugita | H04N 5/23203 |
| 2020/0081323 A1* | 3/2020 | Watanabe | G03B 17/56 |
| 2020/0092461 A1* | 3/2020 | Watanabe | H04N 5/2254 |
| 2020/0096840 A1* | 3/2020 | Kawada | H04N 5/23245 |
| 2020/0096841 A1* | 3/2020 | Okada | G02B 27/646 |
| 2020/0099850 A1* | 3/2020 | Watanabe | H04N 5/232411 |

* cited by examiner

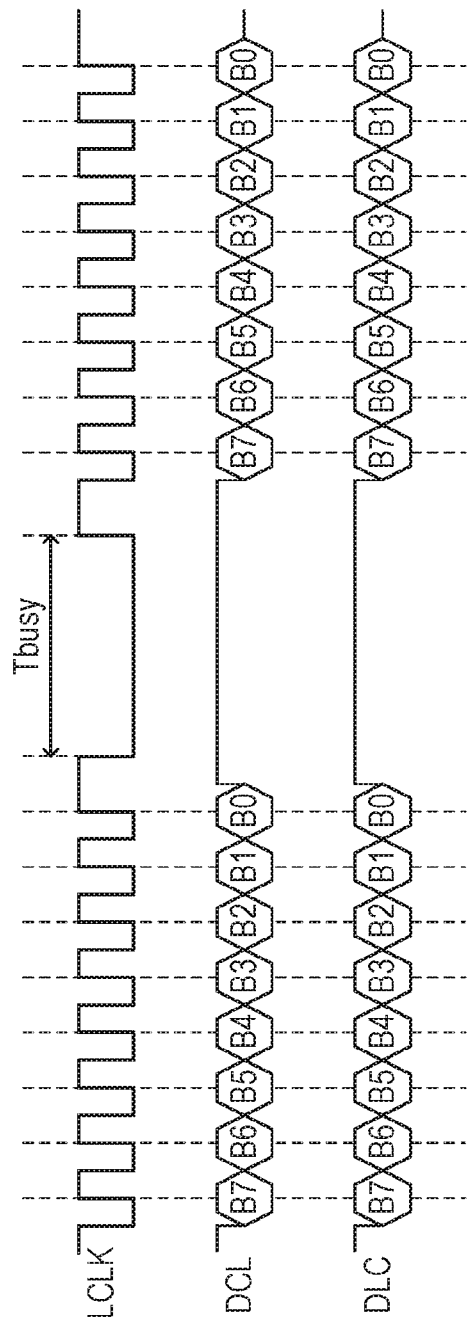

FIG. 10A

| | CAMERA → LENS (FIRST COMMUNICATION) |
|---|---|
| ATTRIBUTE INFORMATION REQUEST | IDENTIFICATION INFORMATION REQUEST |
| | OPERATION STATE INFORMATION REQUEST |

FIG. 10B

| | LENS → CAMERA (FIRST COMMUNICATION) |
|---|---|
| ATTRIBUTE INFORMATION | IDENTIFICATION INFORMATION |
| | OPERATION STATE INFORMATION |

FIG. 10C

| | CAMERA → ACCESSORY (SECOND COMMUNICATION) |
|---|---|
| ATTRIBUTE INFORMATION REQUEST | IDENTIFICATION INFORMATION REQUEST |
| | OPERATION STATE INFORMATION REQUEST |
| | CORRECTION PROCESSING NECESSITY/UNNECESSITY INFORMATION REQUEST |
| | TERMINATION INFORMATION REQUEST |

FIG. 10D

| | ACCESSORY → CAMERA (SECOND COMMUNICATION) (INTERMEDIATE ACCESSORY) |
|---|---|
| ATTRIBUTE INFORMATION | IDENTIFICATION INFORMATION |
| | OPERATION STATE INFORMATION |
| | CORRECTION PROCESSING NECESSITY/UNNECESSITY INFORMATION |
| | TERMINATION INFORMATION |

FIG. 10E

| | ACCESSORY → CAMERA (SECOND COMMUNICATION) (INTERCHANGEABLE LENS) |
|---|---|
| ATTRIBUTE INFORMATION | IDENTIFICATION INFORMATION |
| | OPERATION STATE INFORMATION |
| | CORRECTION PROCESSING NECESSITY/UNNECESSITY INFORMATION (UNNECESSARY) |
| | TERMINATION INFORMATION (HERE IS TERMINATION) |

IMAGING APPARATUS, INTERCHANGEABLE LENS, INTERMEDIATE ACCESSORY, AND CONTROL METHODS THEREFOR

BACKGROUND

Field of the Disclosure

The present disclosure relates to an imaging apparatus in a camera system constituted by an imaging apparatus, one or more intermediate accessories, and an interchangeable lens which mutually perform a communication. This disclosure also relates to an interchangeable lens, an intermediate accessory, and the like.

Description of the Related Art

A camera main body (which is also referred to as an imaging apparatus) which performs imaging processing, image recording, and interchangeable lens control has been proposed as a camera system including a camera main body and an interchangeable lens. In addition, a technology with which the interchangeable lens performs focus driving or aperture driving in accordance with a control command from the camera main body in this camera system has been proposed.

To appropriately perform the focus driving or the aperture driving in the above-described camera system, the camera main body needs to obtain optical information intrinsic to the interchangeable lens (for example, information such as a focal length, an aperture, a focus sensitivity, or a focus correction amount) from the interchangeable lens. The camera main body may previously hold the optical information of the interchangeable lens in some cases, and the optical information may also be obtained from the interchangeable lens via communication in other cases.

In addition, an intermediate accessory may be further attached between the camera main body and the interchangeable lens in some cases in the camera system including the camera main body and the interchangeable lens. For example, a magnification varying lens such as a wide converter or a tele converter that changes a focal length of the interchangeable lens, an accessory for attaching a neutral density (ND) filter or the like that changes a transmittance, and an accessory with which it is possible to attach the interchangeable lens of a different type, are conceivable as the intermediate accessory.

Up to now, an imaging apparatus of a lens interchange method has been proposed in which control software (firmware) stored in an attached lens unit can be updated.

Japanese Patent Laid-Open No. 2011-197094 describes a configuration in which firmware update of an extender attached between the lens unit and the imaging apparatus is performed from the imaging apparatus.

SUMMARY

According to embodiments of the present disclosure, there is provided an imaging apparatus to which an interchangeable lens and an intermediate accessory, which is attachable between the interchangeable lens and the imaging apparatus, are attachable, the imaging apparatus including at least one processor which functions as: a first communication control unit configured to control a first communication via a first communication path where it is possible to mutually communicate with the interchangeable lens; a second communication control unit configured to control a second communication via a second communication path where it is possible to mutually communicate with the intermediate accessory; and a setting unit configured to set an update target of control software from the interchangeable lens and the intermediate accessory, in which, in a case where the setting unit sets the interchangeable lens as the update target, the first communication control unit transmits update data to be applied to the interchangeable lens via the first communication path to the interchangeable lens, and in a case where the setting unit sets the intermediate accessory as the update target, the second communication control unit transmits update data to be applied to the intermediate accessory via the second communication path to the interchangeable lens.

Further features of the present disclosure will become apparent from the following description of exemplary embodiments with reference to the attached drawings.

BRIEF DESCRIPTION OF THE DRAWINGS

FIGS. 2A and 2B are explanatory diagrams for describing a configuration for a first communication according to the first exemplary embodiment.

FIGS. 10A to 10E illustrate examples of information communicated in the initial communication.

DESCRIPTION OF THE EMBODIMENTS

Figure 1A:
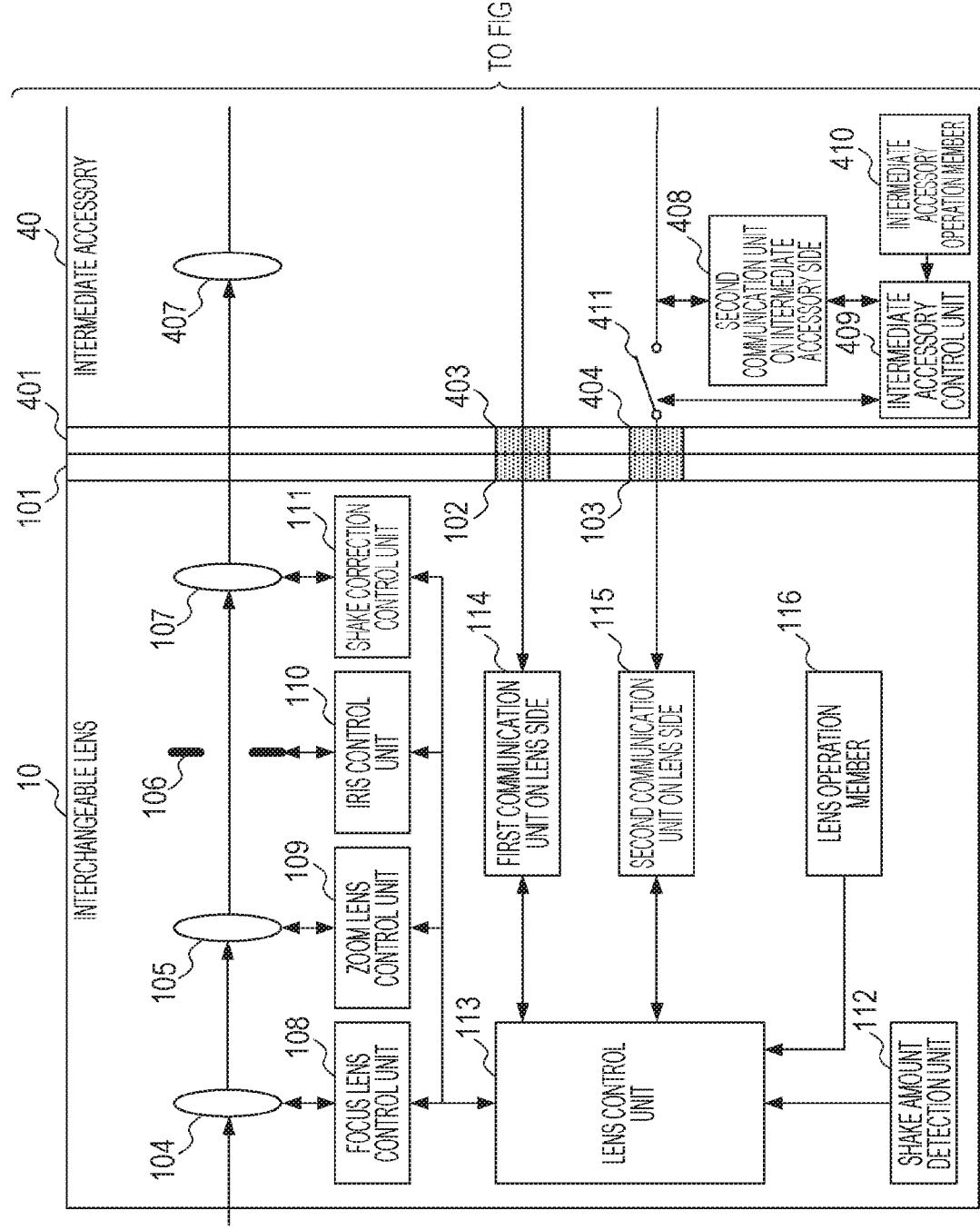
FIGS. 1A and 1B are block diagrams for describing a configuration of a camera system according to a first exemplary embodiment.

Exemplary embodiments will be described below with reference to the drawings. Hereinafter, an accessory refers to an interchangeable lens or an intermediate accessory.

It should be noted that, according to the following exemplary embodiments, each of a camera main body, the interchangeable lens, and the intermediate accessory will also be collectively referred to as a unit. Each of the interchangeable lens and the intermediate accessory will also be collectively referred to as an accessory.

In addition, according to the following exemplary embodiments, an accessory related to a correction refers to the interchangeable lens or the intermediate accessory in which correction processing necessity/unnecessity information is "necessary".

Moreover, according to the following exemplary embodiments, an intermediate accessory related to a correction refers to the intermediate accessory in which a correction of the optical information of the interchangeable lens is necessary.

Furthermore, according to the following exemplary embodiments, a first accessory refers to an accessory that holds optical information of all of the other accessories.

In addition, according to the following exemplary embodiments, a first intermediate accessory refers to an intermediate accessory that has optical information of the other intermediate accessories.

Moreover, according to the following exemplary embodiments, a first unit refers to a unit that holds optical information of all of the accessories.

It should be noted that attention is focused on whether each of the units has the optical information of the other unit according to the following exemplary embodiments, but this is not necessarily related to a release date or a manufacturing date of the unit. For example, irrespective of the release date or the manufacturing date of the unit, the optical information stored by each of the units may be changed by firmware update or the like.

First Exemplary Embodiment

Hereinafter, a first exemplary embodiment will be described.

As described above, Japanese Patent Laid-Open No. 2011-197094 describes the configuration in which the firmware update of the extender attached between the lens unit and the imaging apparatus is performed from the imaging apparatus. However, for example, when the firmware update of the lens unit attached to the end of the extender is executed while the extender is in an abnormal state, there is a fear that the firmware of the lens unit is not correctly updated, and the operation is not performed. However, Japanese Patent Laid-Open No. 2011-197094 does not of course describe countermeasures for the above-described issue but also the issue itself.

In view of the above, according to the present exemplary embodiment, even when an operation state of one of the intermediate accessory and the interchangeable lens attached to the camera is an abnormal state, a camera system in which update processing of the firmware of the other one can be performed will be described.

Figure 1B:
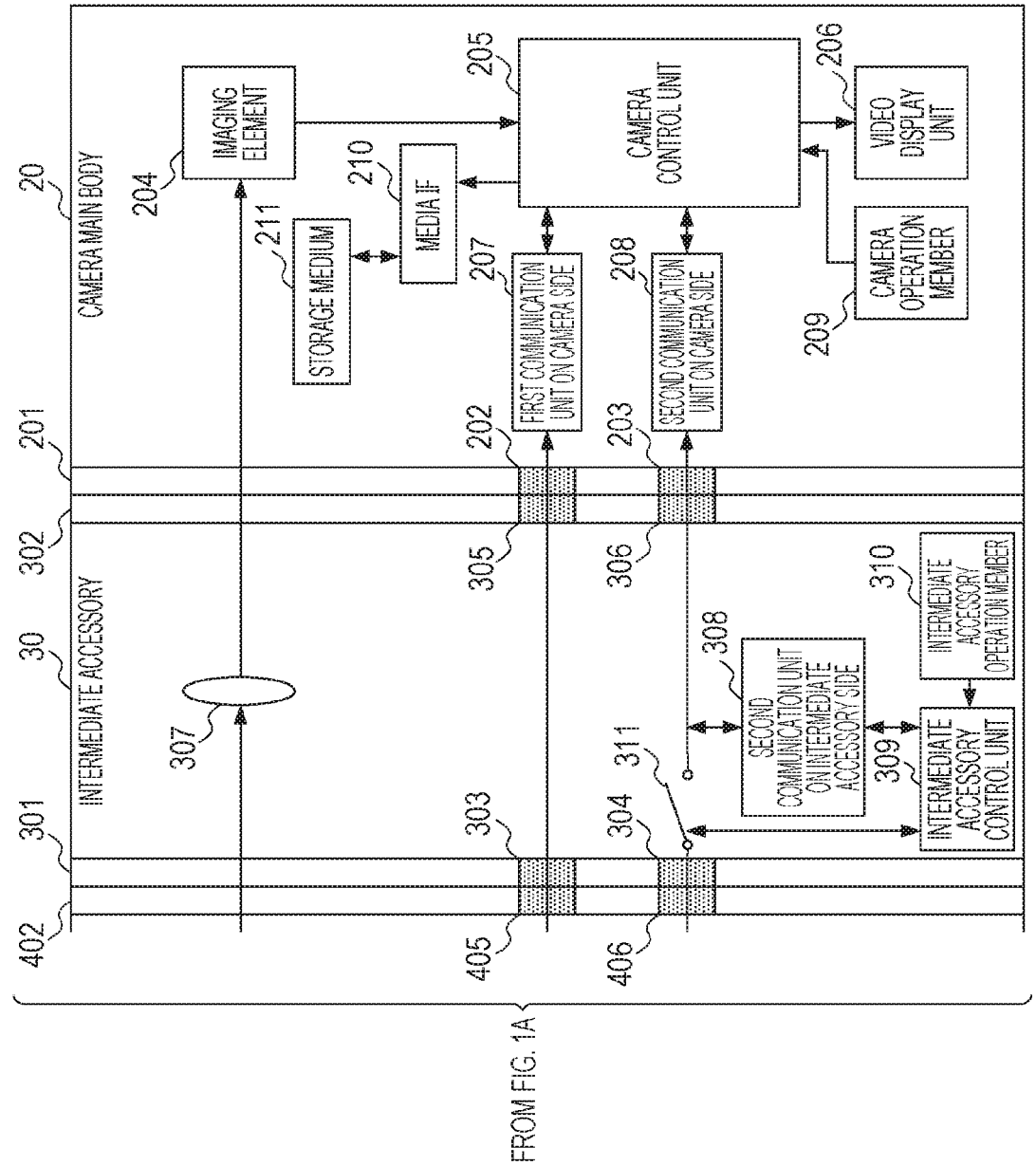

Camera System Configuration (FIGS. 1A and 1B)

A configuration of a camera system according to the present exemplary embodiment will be described with reference to FIGS. 1A and 1B.

The camera system includes a first communication path serving as a communication path for transmission of a control command from a camera main body 20 to an interchangeable lens 10, and transmission of operation information and optical information from the interchangeable lens 10 to the camera main body 20. The camera system also includes a second communication path serving as a communication path for transmission of operation information and optical information between the camera main body 20 and a plurality of intermediate accessories 30 and 40. Hereinafter, a communication performed in the first communication path will also be referred to as a first communication, and a communication performed in the second communication path will also be referred to as a second communication.

Herein, the first communication path refers to a path where a communication is mutually performed between a first communication unit 207 on a camera side and a first communication unit 114 on a lens side via mounts 202 and 305, mounts 303 and 405, and mounts 403 and 102 which will be described below. It should be noted that the first communication unit 207 on the camera side and the first communication unit 114 on the lens side are, respectively, examples of a communication control unit.

The communication performed as described above between a certain unit and a single unit different from the above-described unit will also be referred to as a one-to-one communication according to the present exemplary embodiment.

In addition, herein, the second communication path refers to a path where a communication is performed by a second communication unit 208 on the camera side with the communication units of the respective accessories. At this time, the communication is performed from the second communication unit 208 on the camera side via mounts 203 and 306 and also executed via at least part of mounts 304 and 406 and mounts 404 and 103. The second communication unit 208 on the camera side performs the communication with a second communication unit 115 on the lens side and second communication units 308 and 408 on the intermediate accessory side in the second communication path, for example. It should be noted that the second communication unit 208 on the camera side, the second communication unit 115 on the lens side, the second communication unit 308 on the intermediate accessory side, and the second communication unit 408 on the intermediate accessory side are, respectively, examples of the communication control unit.

The communication performed between a certain unit and a plurality of units different from the above-described unit in this manner is also referred to as a one-to-multi communication according to the present exemplary embodiment.

In FIGS. 1A and 1B, the interchangeable lens 10 is an interchangeable lens configured to control a movable optical member related to capturing. The camera main body 20 is a camera main body configured to capture video (image). The intermediate accessory 30 and the intermediate accessory 40 are an intermediate accessory such as an extender attached between the interchangeable lens 10 and the camera main body 20.

Mounts 101 and 401, mounts 402 and 301, and mounts 302 and 201 are respectively detachably attachable to the interchangeable lens 10, the intermediate accessory 40, the intermediate accessory 30, and the camera main body 20. Herein, the mount 101 is included in the interchangeable lens 10, the mount 401 and the mount 402 are included in the intermediate accessory 40, the mount 301 and the mount 302 are included in the intermediate accessory 30, and the mount 201 is included in the camera main body 20.

First communication contact point groups 102, 403, 405, 303, 305, and 202 functioning as contact point groups having one or more contact points for performing the first communication are respectively included in the mounts 101, 401, 402, 301, 302, and 201. Herein, the first communication contact point groups 102, 403, 405, 303, 305, and 202 have a configuration of being conductive when the interchangeable lens 10, the intermediate accessory 30, the intermediate accessory 40, and the camera main body 20 are connected thereto. According to the first exemplary embodiment, the first communication is also used for the camera main body 20 to control the optical member of the interchangeable lens 10.

Furthermore, second communication contact point groups 103, 404, 406, 304, 306, and 203 functioning as contact point groups having one or more contact points for performing the second communication are respectively included in the mounts 101, 401, 402, 301, 302, and 201. Herein, the second communication contact point groups 103, 404, 406, 304, 306, and 203 have a configuration of being conductive when the interchangeable lens 10, the intermediate accessory 30, the intermediate accessory 40, and the camera main body 20 are connected thereto. According to the first exemplary embodiment, the second communication is configured such that the camera main body 20 can perform the one-to-multi communication with respect to the intermediate accessory 30, the intermediate accessory 40, and the interchangeable lens 10.

In this manner, the first communication path and the second communication path which are different from each other are provided so as to respectively correspond to the first communication where the one-to-one communication is performed between the camera main body 20 and the interchangeable lens 10, and the second communication where the one-to-multi communication is performed between the camera main body and the plurality of accessories. With this configuration, as compared with a case where the communication is performed by using the same communication path, for example, an interchangeable lens control command can be transmitted to the interchangeable lens at a more appropriately intended timing by the first communication. Since the interchangeable lens control command can be immediately transmitted at the intended timing by the camera main body to the interchangeable lens, it is possible to control the plurality of optical members implemented in the interchangeable lens at a high speed and a high accuracy.

The interchangeable lens 10 is provided with a focus lens 104, a zoom lens 105, an iris 106, and a shake correction lens 107 which constitute an optical system, control units (108 to 111) configured to control the respective optical members, and a lens control unit 113 configured to control the entirety of the lenses. The interchangeable lens 10 is further provided with a first communication unit 114 on the lens side which performs the first communication, a second communication unit 115 on the lens side which performs the second communication, a shake amount detection unit 112 that detects a shake amount, and a lens operation member 116 that is an operation member included in the interchangeable lens. The respective configurations will be described.

The focus lens 104 is configured to change a focus state of the captured video. The zoom lens 105 is configured to perform zooming of the captured video. The iris 106 is configured to perform a light amount correction of the captured video. The shake correction lens 107 is a shake correction lens configured to correct an image shake of an object image.

The focus lens control unit 108 performs position detection and drive control of the focus lens 104. The zoom lens control unit 109 performs position detection and drive control of the zoom lens 105. The iris control unit 110 performs position detection and drive control of the iris 106. The shake correction control unit 111 is a shake correction control unit configured to perform position detection and drive control of the shake correction lens 107. The focus lens control unit 108, the zoom lens control unit 109, the iris control unit 110, and the shake correction control unit 111 are respectively constituted, for example, by a position sensor such as an absolute value encoder and an ultrasonic wave motor and a driving motor such as a stepping motor. The shake amount detection unit 112 is configured to detect a shake amount of the interchangeable lens 10 and is constituted, for example, by a gyro sensor.

The lens control unit 113 is configured to control the lens and includes a memory which is not illustrated in the drawing. The lens control unit 113 is an example of a communication control unit. The first communication unit 114 on the lens side is configured to perform the first communication in the interchangeable lens 10. The second communication unit 115 on the lens side is configured to perform the second communication in the interchangeable lens 10.

The memory included in the lens control unit 113 is constituted by a rewritable non-volatile memory and stores control software (firmware) executed by a central processing unit (CPU) and intrinsic information and state information related to the interchangeable lens 10. The intrinsic information is, for example, a model name (identification information), optical characteristics, correction information, and the like. The state information is, for example, an operation state (normal/safe mode), position information (or magnification) of the zoom lens 105, position information of the focus lens 104, an F-number of the iris 106, position information of the shake correction lens 107, a version and an update state of the firmware, and the like. It should be noted however that the information is not limited to these. The memory also stores a program executed when the interchangeable lens 10 is operated in the safe mode which will be described below.

The lens control unit 113 includes a programmable processor such as the CPU and realizes various operations represented by an operation of the interchangeable lens 10 which will be described below by reading out the program from the memory to be executed. For example, the lens control unit 113 executes an operation in accordance with a command received from a camera control unit 205 by the first communication which will be described below. The operation in accordance with the command refers to control of the focus lens control unit 108, the zoom lens control unit 109, the iris control unit 110, and the shake correction control unit 111 and execution of the update of the firmware stored in the memory, for example.

The lens control unit 113 updates the firmware by overwriting old firmware stored in the memory with new firmware received from the camera main body 20 by the first communication, for example. In addition, the lens control unit 113 records data representing a state of the update processing of the firmware (update state data) in the memory to manage update processing. For example, before the overwrite of the firmware is performed, the lens control unit 113 sets the update state data as a value indicating "not completed" and sets the update state data as a value indicating "completed" when the overwrite of the firmware is completed. It should be noted that the value indicating "completed" may differ in a value indicating "normally completed" and a value indicating "abnormally completed". The value indicating "abnormally completed" may also differ in accordance with a cause of the abnormality.

For example, in a case where the interchangeable lens 10 is detached during the update of the firmware, since the power supply to the interchangeable lens 10 is cut off, the update processing is interrupted while the update state data remains the value indicating "not completed". For example, the lens control unit 113 checks the update state data when power is supplied again. In a case where the update state data is the value indicating the "not completed" state, since a state is established in which the update of the firmware is interrupted, the mode shifts to a mode in which the operation is restricted (safe mode). In the safe mode, restricted functions alone can be executed including the processing necessary for performing the update of the firmware. Specifically, the processing necessary for performing the update of the firmware refers to processing for transmitting identification information and operation state information (or a firmware update request) of the interchangeable lens 10 to the camera main body 20. In addition, the processing for updating the firmware recorded in the memory with the firmware received from the camera main body 20 is the processing necessary for performing the update of the firmware.

The other processing such as, for example, the control of the focus lens control unit 108 is not performed.

Normally, a capacity of the memory is not large enough to store dual set data of the entire firmware. For this reason, the capacity that can be used for the storage for a program used in the safe mode is limited. Therefore, in the safe mode, only the restricted functions including necessary minimum functions such as the transmission of the operation state of the interchangeable lens 10 and the update of the firmware are provided. In a case where the lens control unit 113 receives a request of processing that is not to be executed in the safe mode by the first communication during the safe mode such as, for example, a drive request of the focus lens 104, the lens control unit 113 ignores the request. The lens operation member 116 is an operation member included in the interchangeable lens 10 and is a switch or an electronic ring, for example. When the lens operation member 116 is operated, an operation signal is output to the lens control unit 113.

Next, a configuration of the camera main body 20 will be described. The camera main body 20 is provided with an imaging element 204, the camera control unit 205 configured to control the camera main body, a video display unit 206 configured to display the video captured by the camera main body 20, and a camera operation member 209 corresponding to an operation member included in the camera main body 20. Furthermore, the camera main body 20 is provided with the first communication unit 207 on the camera side and the second communication unit 208 on the camera side configured to control the first communication and the second communication. The respective configurations will be described.

The imaging element 204 is an imaging element configured to capture video and is a complementary metal-oxide semiconductor (CMOS) image sensor, for example.

The camera control unit 205 is configured to control the camera main body and includes a memory which is not illustrated in the drawing. The camera control unit 205 is an example of the communication control unit. The first communication unit 207 on the camera side is configured to perform the first communication in the camera main body 20. The second communication unit 208 on the camera side is configured to perform the second communication in the camera main body 20. The camera control unit 205, the first communication unit 207 on the camera side, and the second communication unit 208 on the camera side is constituted, for example, by using the CPU in the camera main body 20.

The video display unit 206 is a liquid crystal monitor, for example, and is used for displaying the video captured by the camera main body 20, image data recorded in a recording medium 211, a graphical user interface (GUI), or the like. At this time, the video display unit 206 is also used for displaying a menu for a user to instruct the firmware update of the interchangeable lens 10 or the intermediate accessories 30 and 40. In addition, when the camera control unit 205 detects that the attached interchangeable lens 10 or the attached intermediate accessories 30 and 40 are in the safe mode, it is possible to notify the user that the update of the firmware is necessary by displaying a message or the like.

The camera operation member 209 is configured to set a capturing condition and is a dial ring or a switch, for example. When the camera operation member 209 is operated, the operation signal is output to the camera control unit 205.

A media IF 210 is, for example, an interface for performing recording and readout of data with respect to the recording medium 211 corresponding to a detachably attachable memory card.

The recording medium 211 is used as a recording destination of image data or audio data obtained by capturing by the camera main body 20 and is also used as a supply source of the new firmware at the time of the firmware update of the camera main body 20, the interchangeable lens 10, and the intermediate accessories 30 and 40.

The intermediate accessories 30 and 40 respectively include intermediate accessory optical members 307 and 407, the second communication units 308 and 408 on the intermediate accessory side configured to perform the second communication, and intermediate accessory control units 309 and 409 configured to perform control of the intermediate accessory. Furthermore, the intermediate accessories 30 and 40 are respectively provided with intermediate accessory operation members 310 and 410 corresponding to operation members included in the intermediate accessories. The respective configurations will be described.

For example, the intermediate accessory optical members 307 and 407 according to the present exemplary embodiment are optical members that provide change in optical characteristics with respect to the captured video. The intermediate accessory optical members 307 and 407 are, for example, a magnification varying lens or an ND filter.

The second communication units 308 and 408 on the intermediate accessory side are communication units configured to perform the second communication in the intermediate accessory 30 and the intermediate accessory 40.

The intermediate accessory control units 309 and 409 are control units configured to respectively control the intermediate accessory 30 and the intermediate accessory 40 and include a memory which is not illustrated in the drawing.

Each of the intermediate accessory control units 309 and 409 is an example of the communication control unit. The intermediate accessory control units 309 and 409 and the second communication units 308 and 408 on the intermediate accessory side are configured by using the CPU of the intermediate accessory.

The memory included in the intermediate accessory control units 309 and 409 is constituted by a writable non-volatile memory and stores software (firmware) executed by the CPU and the intrinsic information and the state information related to the intermediate accessories 30 and 40. The intrinsic information is, for example, the model name (identification information), the optical characteristics, the correction information, and the like. In addition, the state information is, for example, the operation state (normal/safe mode), the operation information (position and speed) of the intermediate accessory operation members 310 and 410, the version and the update state of the firmware, and the like. It should be noted however that the information is not limited to these. The memory also stores a program for executing the processing executed when the intermediate accessories 30 and 40 are operated in the safe mode which will be described below.

The intermediate accessory control units 309 and 409 also include a programmable processor such as a CPU and read out the program from the memory to realize various operations represented by the operations of the intermediate accessories 30 and 40 which will be described below. For example, the intermediate accessory control units 309 and 409 execute the operations in accordance with the commands received from the camera control unit 205 by the second communication which will be described below such as, for example, the transmission of the operation information of the intermediate accessory operation members 310 and 410 and the update of the firmware stored in the memory.

The intermediate accessory control units 309 and 409 update the firmware by overwriting the old firmware stored in the memory with the new firmware received from the camera main body 20 by the first communication, for example. The intermediate accessory control units 309 and 409 also record the data representing the state of the update processing of the firmware (update state data) in the memory to manage the update processing. For example, the intermediate accessory control units 309 and 409 set the update state data as the value indicating "not completed" before the overwrite of the firmware is performed and sets the update state data as the value indicating "completed" when the overwrite of the firmware is completed. It should be noted that the value indicating "completed" may differ in the value indicating "normally completed" and the value indicating "abnormally completed". The value indicating "abnormally completed" may be a different value in accordance with the cause of the abnormality.

For example, when the intermediate accessories 30 and 40 are detached during the update of the firmware, since the power supply to the intermediate accessories 30 and 40 is cut off, the update processing is interrupted while the update state data remains the value indicating "not completed". For example, the intermediate accessory control units 309 and 409 check the update state data when power is supplied again. In a case where the update state data is the value indicating the "not completed" state, the mode shifts to the mode where the operation is restricted (safe mode).

In the safe mode, restricted functions alone including the processing necessary for performing the update of the firmware can be executed. Specifically, the processing for performing the update of the firmware is processing for transmitting the identification information of the intermediate accessories 30 and 40 and the attribute information such as information indicating the safe mode (or the request for the firmware update) to the camera main body 20. In addition, the processing for updating the firmware recorded in the memory by the firmware received from the camera main body 20 is also the processing necessary for performing the update of the firmware. The other processing such as, for example, the transmission of the operation information of the intermediate accessory operation members 310 and 410 is not performed.

Normally, the capacity of the memory is not large enough to store the dual set data of the entire firmware. For this reason, the capacity that can be used for the storage for a program used in the safe mode is limited. Therefore, in the safe mode, only the restricted functions including necessary minimum functions such as the transmission of the operation states of the intermediate accessories 30 and 40 and the update of the firmware are provided. In a case where the intermediate accessory control units 309 and 409 receive a request of processing that is not to be performed in the safe mode by the second communication during the safe mode such as, for example, the transmission of the operation information of the intermediate accessory operation members 310 and 410, the intermediate accessory control units 309 and 409 ignore the request.

The intermediate accessory operation members 310 and 410 are respectively operation members included in the intermediate accessory 30 and the intermediate accessory 40. For example, the intermediate accessory operation members 310 and 410 are a switch or an electronic ring. When the intermediate accessory operation members 310 and 410 are operated, the operation signals are output to the intermediate accessory control units 309 and 409.

The second communication connection switch 311 and the second communication connection switch 411 are respectively switches which are on second communication lines of the intermediate accessory 30 and the intermediate accessory 40, and are also provided on the lens side with respect to the second communication unit of the intermediate accessory side. The second communication connection switch 311 and the second communication connection switch 411 can respectively control short-circuiting and opening by the intermediate accessory control unit 309 and the intermediate accessory control unit 409. When these switches are provided, it is possible to cut off the second communication on the lens side with respect to itself. That is, when the short-circuiting and the opening of these switches are controlled, it is possible to change a communication state of the second communication.

According to the first exemplary embodiment, a flow for light incident on the interchangeable lens 10 to be output as video is as follows.

The light incident on the interchangeable lens 10 passes through the focus lens 104, the zoom lens 105, the iris 106, the shake correction lens 107, and the intermediate accessory optical members 407 and 307 to be imaged on the imaging element 204 and converted into an electric signal. The electric signal output from the imaging element 204 is changed by the camera control unit 205 into a video signal to be output to the video display unit 206.

Figure 2A:
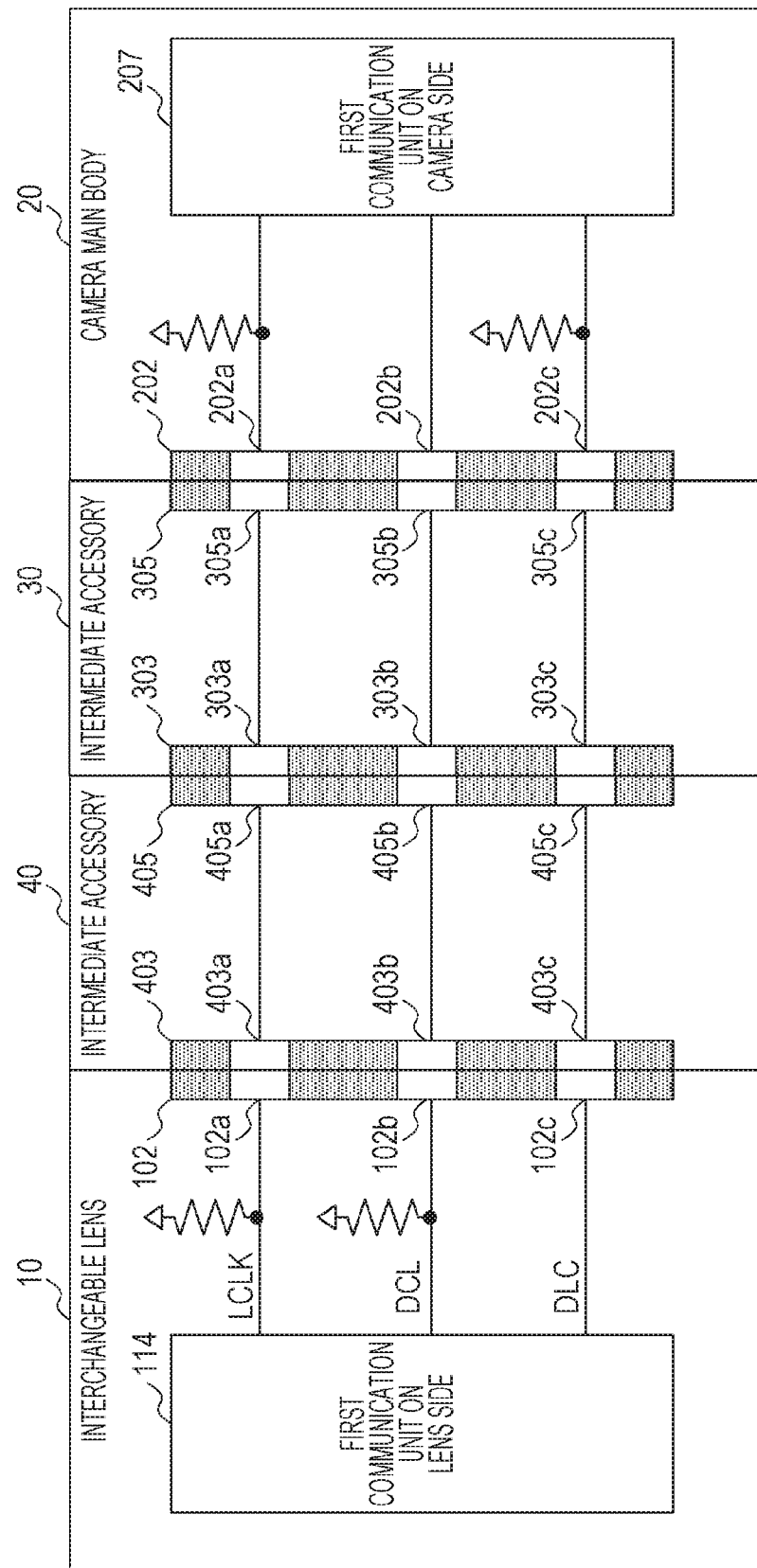

First Communication (FIGS. 2A and 2B)

Next, the first communication will be described with reference to FIGS. 2A and 2B.

FIG. 2A illustrates a configuration in which the first communication is performed. A case where a clock synchronous communication is performed as the first communication will be exemplified according to the present exemplary embodiment, but an asynchronous communication may also be performed. The asynchronous communication will be described below as a modified example. First communication LCLK terminals 102a, 403a, 405a, 303a, 305a, and 202a functioning as terminals of a clock line LCLK output from the first communication unit 207 on the camera side are respectively included in the first communication contact point groups 102, 403, 405, 303, 305, and 202. In addition, according to the present exemplary embodiment, similarly, first communication DCL terminals 102b, 403b, 405b, 303b, 305b, and 202b functioning as terminals of a data line DCL output from the first communication unit 207 on the camera side of the clock synchronous communication are included. It should be noted that each of the first communication DCL terminals 102b, 403b, 405b, 303b, 305b, and 202b is an example of a first communication terminal. Furthermore, similarly, first communication DLC terminals 102c, 403c, 405c, 303c, 305c, and 202c functioning as terminals of a data line DLC output from the first communication unit 114 on the lens side of the clock synchronous communication are included. It should be noted that each of the first communication DLC terminals 102c, 403c, 405c, 303c, 305c, and 202c is an example of a third communication terminal.

As illustrated in FIG. 2A, the clock line LCLK and the data line DCL are pull-up connected to an electric potential in the interchangeable lens 10. In addition, the clock line LCLK and the data line DLC are pull-up connected to an electric potential in the camera main body 20.

The clock line LCLK, the data line DCL, and the data line DLC in the intermediate accessory 30 and the intermediate accessory 40 are respectively short-circuited between the first communication contact point groups 403 and 405, and the first communication contact point groups 303 and 305.

FIG. 2B illustrates waveforms of the clock line LCLK, the data line DCL, and the data line DLC when the first communication is performed. The first communication unit 207 on the camera side outputs a clock to the clock line LCLK and also outputs 8-bit data of B7 to B0 to the data line DCL in synchronism with rising signals of the clock line LCLK. Similarly, the first communication unit 114 on the lens side outputs 8-bit data of B7 to B0 to the data line DLC in synchronism with the rising signals of the clock line LCLK. Furthermore, the first communication unit 207 on the camera side receives the 8-bit data of B7 to B0 of the data line DLC in synchronism with the rising signals of the clock line LCLK. Similarly, the first communication unit 114 on the lens side receives the 8-bit data of B7 to B0 of the data line DCL in synchronism with the rising signals of the clock line LCLK. With the above-described processing, the first communication unit 207 on the camera side and the first communication unit 114 on the lens side can mutually exchange the communication data. When the first communication unit 114 on the lens side receives the 8-bit data of B7 to B0 of the data line DCL, the first communication unit 114 performs LOW output of the clock line LCLK for a Tbusy time and thereafter cancels the LOW output. Herein, the Tbusy time is a time when the interchangeable lens 10 processes the received data. A configuration is adopted in which, after the data transmission, the first communication unit 207 on the camera side does not perform the data transmission until the clock line LCLK changes from LOW to HIGH. With the signal control, it is possible to perform a flow control of the first communication. When the above-described processing is repeated, it is possible to transmit the data between the first communication unit 207 on the camera side and the first communication unit 114 on the lens side by the first communication.

Figure 12:
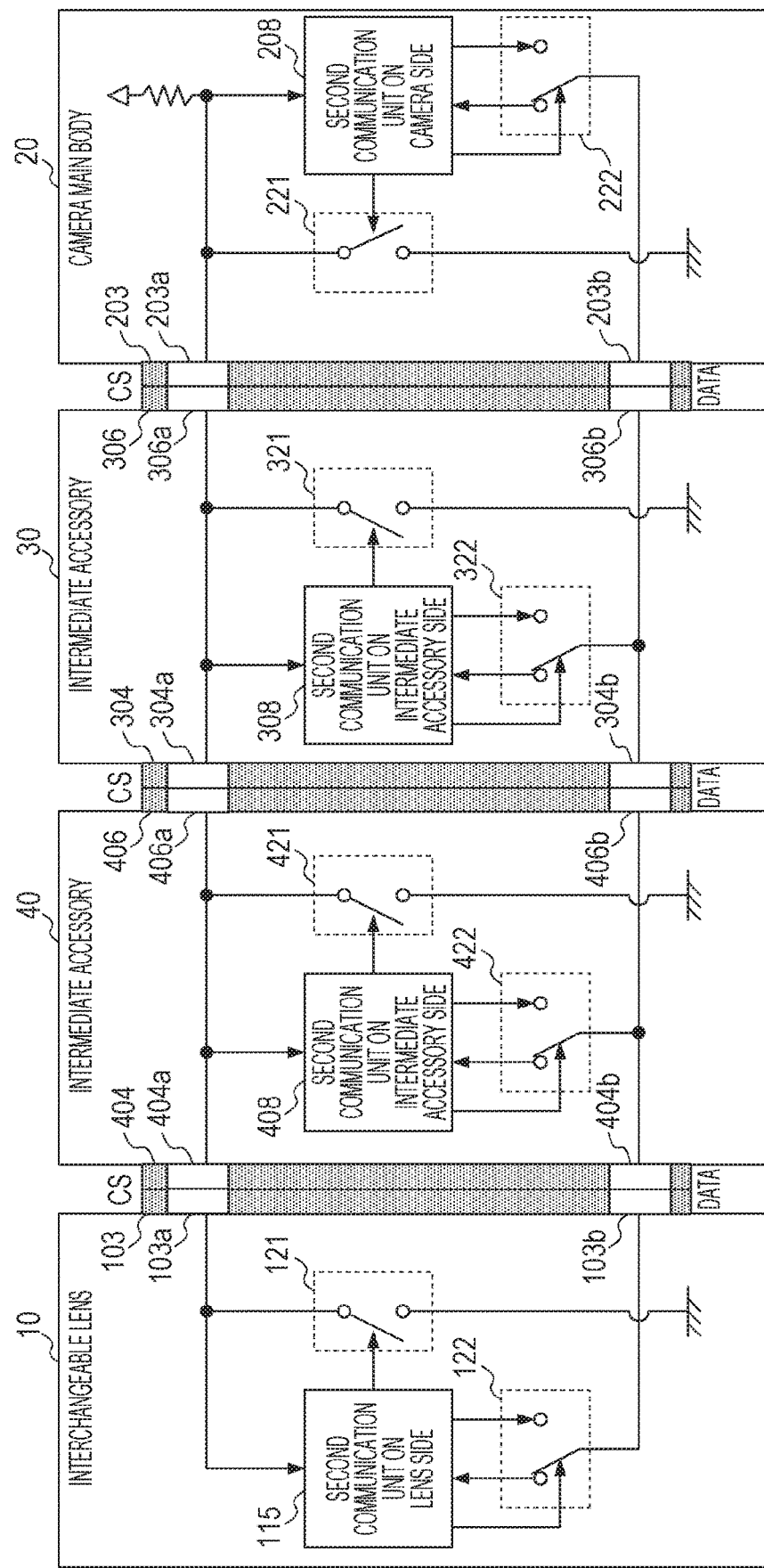
FIG. 12 is an explanatory diagram for describing a configuration for a second communication according to the first exemplary embodiment.

Second Communication (FIG. 12)

Next, one of communication circuits where the "one-to-multi" communication established among the camera main body 20, the interchangeable lens 10, the intermediate accessory 30, and the intermediate accessory 40 can be performed will be described with reference to a configuration diagram of FIG. 12. It should be noted that the communication circuit is not limited to this as long as communication circuit can be performed. Furthermore, in a case where a plurality of communication circuits are included, with regard to another communication circuit, the "one-to-one" communication such as a serial communication of a clock synchronous method or a UART communication may also be performed.

The second communication unit 208 on the camera side, the second communication unit 115 on the lens side, and the second communication units 308 and 408 on the intermediate accessory side are connected to one another via contact portions similarly as in the first communication. More specifically, the connections are established via the second communication contact groups 103, 404, 406, 304, 306, and 203 described above. According to the present exemplary embodiment, the second communication contact point groups 103, 404, 406, 304, 306, and 203 respectively include CS signal terminals 103a, 404a, 406a, 304a, 306a, and 203a and DATA signal terminals 103b, 404b, 406b, 304b, 306b, and 203b. The second communication unit 208 on the camera side, the second communication unit 115 on the lens side, and the second communication unit 308 on the intermediate accessory side perform a communication by using a CS signal line connected via the CS signal terminals and a DATA signal line connected via the DATA signal terminals.

It should be noted that the DATA signal terminals respectively included in the second communication contact point groups 103, 404, 406, 304, 306, and 203 are an example of a second communication terminal.

A camera communication circuit is constituted by a ground switch 221 and an input and output switching switch 222. A lens communication circuit is constituted by a ground switch 121 and an input and output switching switch 122. An intermediate accessory communication circuit is constituted by ground switches 321 and 421 and input and output switching switches 322 and 422.

The signal line is constituted by two lines including a CS signal line (first signal line) for conveying a signal for performing a flow control of the communication and a DATA signal line (second signal line) for conveying data to be transmitted and received.

The CS signal line is connected to the second communication unit 208 on the camera side, the second communication unit 308 on the intermediate accessory side, and the second communication unit 115 on the lens side and has a configuration in which a state of the signal line (Hi/Low) can be detected. The CS signal line has a pull-up connection to a power source which is not illustrated in the drawing in the camera main body. The CS signal line has a configuration in which it is possible to connect to GND via the ground switch 121 of the interchangeable lens 10, the ground switch 221 of the camera main body 20, and the ground switches 321 and 421 of an intermediate adapter (open drain connection). According to this configuration, it is possible to set the state of the CS signal line as Low when the interchangeable lens 10, the camera main body 20, and the intermediate accessories 30 and 40 respectively turn on the ground switches (connection). On the other hand, it is possible to set the state of the CS signal line as Hi when all of the interchangeable lens 10, the camera main body 20, and the intermediate accessories 30 and 40 turn off (cut off) the respective connection switches. The CS signal line is used to distinguish a broadcast communication from a peer-to-peer (P2P) communication or to switch a communication direction in the P2P communication, for example.

The DATA signal line is a single-track bidirectional data transmission line that can be used while a conveyance direction of the data is switched. The DATA signal line can be connected to the second communication unit 115 on the lens side via the input and output switching switch 122 of the interchangeable lens 10. The DATA signal line can also be connected to the second communication unit 208 on the camera side via the input and output switching switch 222 of the camera main body 20. In addition, the DATA signal line can be connected to the second communication units 308 and 408 on the intermediate accessory side respectively via the input and output switching switches 322 and 422 of the intermediate accessories 30 and 40. Each microcontroller is provided with a data output unit configured to transmit the data (CMOS method) and a data input unit configured to receive the data (CMOS method). It is possible to select whether the DATA signal line is connected to the data output unit or connected to the data input unit by operating the input and output switching switch. According to this configuration, in a case where the interchangeable lens 10, the camera main body 20, or the intermediate accessory 30 or 40 transmits the data by itself, the data transmission can be performed when the interchangeable lens 10, the camera main body 20, or the intermediate accessory 30 or 40 each operates the input and output switching switch so as to connect the DATA signal line to the data output unit. On the other hand, in a case where the interchangeable lens 10, the camera main body 20, or the intermediate accessory 30 or 40 receives the data by itself, the data reception can be performed when the interchangeable lens 10, the camera main body 20, or the intermediate accessory 30 or 40 each operates the input and output switching switch so as to connect the DATA signal line to the data input unit.

Here, the broadcast communication and the P2P communication performed by a CS signal and a data signal will be described.

Since the CS signal line drops to LOW when any one of the units is connected to GND, the CS signal line is used as a trigger of the broadcast communication.

The broadcast communication is started when the camera main body acting as a main subject of the communication causes the CS signal line to be LOW. It is determined that data received by the accessory by the DATA line when the CS signal line is LOW is broadcasted data.

In addition, it is possible to request the camera main body for the broadcast communication when each accessory causes the CS signal line to be LOW.

While the unit that has detected the LOW state of the CS signal line turns on its own ground switch during the process of broadcasting, it is possible to notify the other unit that the process with respect to the broadcast communication continues. While it is regulated that the second communication starts by the broadcast communication and ends by the broadcast communication, the DATA signal line of the accessory may basically maintain the reception state. In a case where the camera performs the P2P communication with the accessory, the accessory of a communication target is first specified by the broadcast communication. The camera that has completed the transmission of the broadcast communication and the specified accessory perform the P2P communication.

In the P2P communication, the camera first transmits data, and the accessory that has received the data transmits data to the camera. This process is alternately performed thereafter. In the P2P communication, the CS signal during the communication maintains HIGH to be distinguished from the broadcast communication. The CS signal in the P2P communication is used as a busy signal. That is, LOW is set for the camera and the accessory to notify that the data transmission is ended from itself to the partner, and HIGH is set to notify that the preparation of the data reception is completed.

When the P2P communication is ended, the camera performs the broadcast communication with regard to the end of the P2P communication.

With this configuration, the camera can perform the data communication via the two communication lines with a plurality of accessories.

It should be noted that FIG. 12 illustrates an example of the communication circuit according to the exemplified embodiment of the present disclosure, but the present disclosure is not limited to this. For example, a configuration may be adopted in which the CS signal line is subjected to pull-down connection to GND in the camera main body 20, and also a connection can be established to a power source which is not illustrated in the drawing via the ground switch 121 of the interchangeable lens 10, the ground switch 221 of the camera main body 20, and the ground switches 321 and 421 of the intermediate accessories 30 and 40. In addition, a configuration may be adopted in which the DATA signal line is regularly connected to each of the data input units, and connection/cutoff between the DATA signal line and each of the data output units can be operated by a switch.

The second communication can be realized by the same communication method as the first communication, a bi-directional asynchronous communication method, a master/slave method, a token passing method, or the like.

Figure 3:
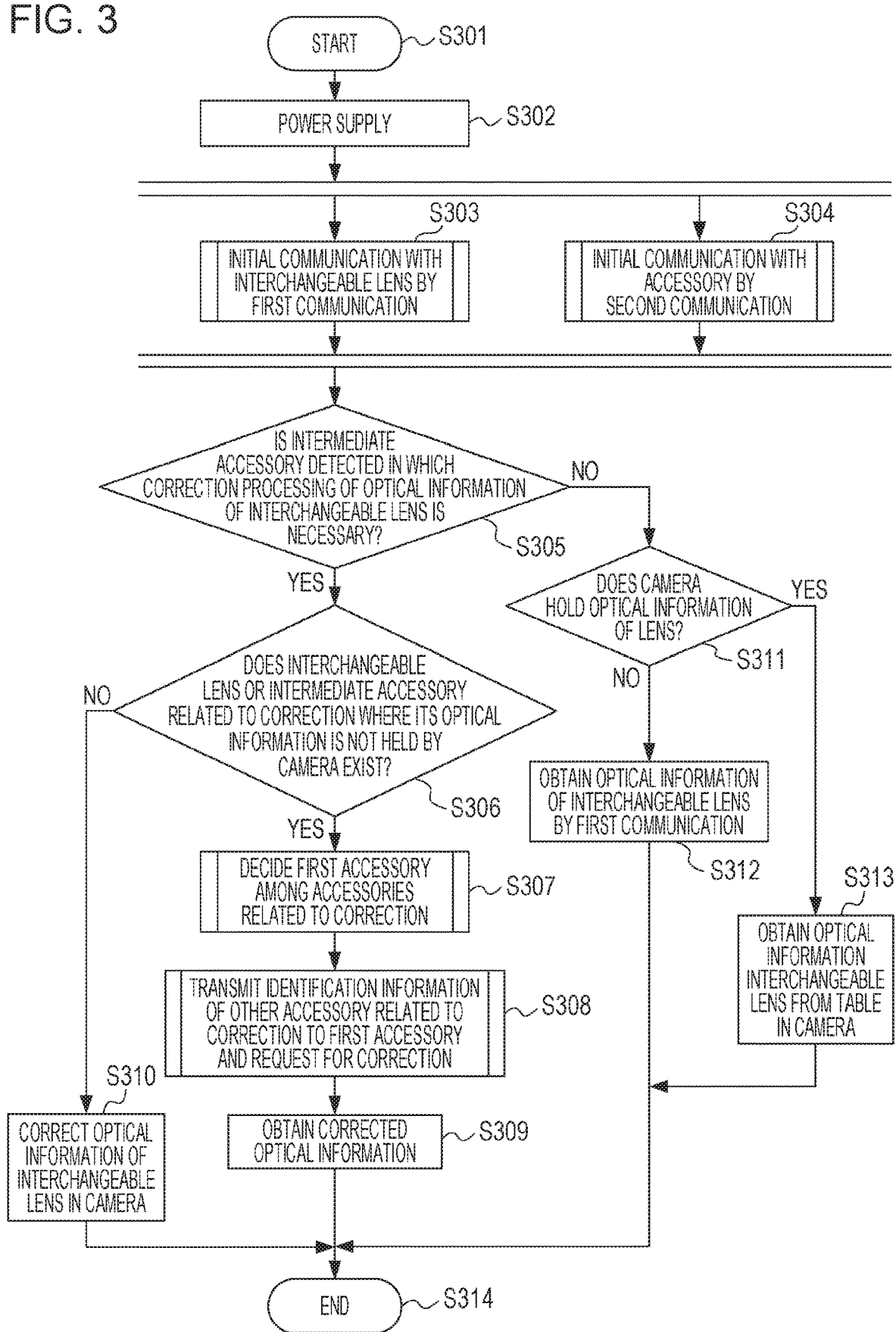
FIG. 3 is a flow chart illustrating a flow of processing for obtaining corrected optical information according to the first exemplary embodiment.

Corrected Optical Information Obtaining Processing (FIG. 3)

Next, a flow for the camera main body 20 to obtain the optical information of the interchangeable lens 10 which has been corrected on the basis of the optical information of the intermediate accessory 30 and the intermediate accessory 40 will be described with reference to FIG. 3. It should be noted that the optical information of the intermediate accessory is, for example, a magnification that changes depending on insertion of the intermediate accessory in a case where the intermediate accessory includes the magnification varying lens. In addition, the optical information of the interchangeable lens 10 is, for example, information such as a focal length, an aperture, a focus sensitivity, or a focus correction amount.

FIG. 3 illustrates a flow of processing for the camera main body 20 to obtain the optical information of the interchangeable lens 10, which has been corrected on the basis of the optical information of the intermediate accessory 30 and the intermediate accessory 40 after power is supplied for the first time since the intermediate accessory and the interchangeable lens are attached.

In S301, the camera main body 20 is activated, and the flow shifts to S302.

When the flow shifts to S302, the camera main body 20 supplies power to the interchangeable lens 10, the intermediate accessory 30, and the intermediate accessory 40 via mount contact points for power supply which are not illustrated in the drawings, and the flow shifts to S303 and S304.

When the flow shifts to S303, the camera control unit 205 performs the initial communication with the interchangeable lens 10 by the first communication. In the initial communication, attribute information of the interchangeable lens 10 is obtained.

Herein, the attribute information of the interchangeable lens 10 includes the identification information and the operation state information of the interchangeable lens 10. The interchangeable lens identification information may be information such as a model number (ID) used for identifying a type (model) of the interchangeable lens or optical data identification information indicating the optical data intrinsic to the interchangeable lens. The interchangeable lens identification information may also include information indicating a function that the interchangeable lens has or information such as a manufacturing number (serial number) with which it is possible to identify an individual piece among the same model.

The operation state information is information with which it is possible to discriminate whether the interchangeable lens 10 normally operates or operates in the safe mode, in other words, information with which it is possible to discriminate whether the update of the firmware is in an interrupted state (operated in the safe mode) or not (operated normally).

A flow of sub-process S303 for obtaining attribute information of the interchangeable lens 10 by the first communication will be described below with reference to FIG. 4.

When the flow shifts to S304, the camera control unit 205 performs the initial communication with the accessory by the second communication and obtains accessory attribute information.

Herein, the accessory attribute information includes the identification information of the accessory, the correction processing necessity/unnecessity information, and the operation state information.

The intermediate accessory identification information may be information such as a model number (ID) used for identifying a type (model) of the intermediate accessory or optical data identification information indicating the optical data intrinsic to the intermediate accessory. The intermediate accessory identification information may also include information indicating a function that the intermediate accessory has or information such as a manufacturing number (serial number) with which it is possible to identify an individual piece among the same model.

The correction processing necessity/unnecessity information is information indicating whether or not the correction of the optical information of the interchangeable lens 10 becomes necessary after the attachment of the accessory. In a case where the accessory is the intermediate accessory and does not affect the optical system of the interchangeable lens 10, the correction processing is unnecessary. When the camera control unit 205 understands in advance that the correction processing due to the attachment of the intermediate accessory is unnecessary on the basis of the correction processing necessity/unnecessity information of the intermediate accessory, the camera can ignore the intermediate accessory in the obtaining processing of the optical information of the interchangeable lens 10.

The intermediate accessory in which the correction processing is unnecessary includes, for example, an intermediate accessory provided with an optical member optically designed so as to cancel an influence onto the optical system causes by its own width and attached for a purpose of installing an extra operation member. The intermediate accessory also includes a mount converter to be attached between the interchangeable lens of the mount having a short flange focus and the camera main body to change to have a flange focus length appropriate to the camera main body, and the like.

The operation state information is information with which it is possible to discriminate whether the intermediate accessories 30 and 40 normally operate or operate in the safe mode, in other words, information with which it is possible to discriminate whether the update of the firmware in an interrupted state (operated in the safe mode) or not (operated normally).

A flow of sub-process in S304 for obtaining attribute information of the intermediate accessory by the second communication will be described below with reference to FIG. 5. The processes in S303 and S304 may be performed in parallel or may also be sequentially performed since the different communication paths are used.

When the identification information of the interchangeable lens and the attribute information of the attached accessory are obtained in S303 and S304, the flow shifts to S305.

When the flow shifts to S305, the camera control unit 205 determines whether or not the intermediate accessory in which the correction processing of the optical information of the interchangeable lens is necessary exists on the basis of the correction processing necessity/unnecessity information obtained in S304. In a case where the intermediate accessory in which the correction processing necessity/unnecessity information is "necessary" (will be also referred to as an intermediate accessory related to the correction) is attached, the flow shifts to S306.

When the flow shifts to S306, the camera control unit 205 determines whether or not the accessory where its optical information is not held by the camera control unit 205 exists among the interchangeable lens and the intermediate accessories in which the correction processing necessity/unnecessity information is "necessary" in S305. It should be noted that the interchangeable lens and the intermediate accessories in which the correction processing necessity/unnecessity information is "necessary" in S305 will be also referred to as the accessories related to the correction. In a case where the camera control unit 205 determines that the accessory where its optical information is not held by the camera control unit 205 exists among the accessories related to the correction, the correction processing of the optical information of the interchangeable lens is not performed in the camera control unit 205. In this case, to search for a request destination of the correction processing, the flow shifts to S307.

When the flow shifts to S307, the camera control unit 205 decides an accessory that holds the optical information of all the other accessories (will be also referred to as a first accessory) among the accessories related to the correction. As a method of deciding the first accessory, for example, the determination may be performed on the basis of the identification information obtained from the accessory, or an enquiry is made to the accessory by the communication. A detail thereof will be described below with reference to FIG. 6.

When the first accessory is confirmed in S307, the flow shifts to S308.

When the flow shifts to S308, the camera control unit 205 transmits the identification information of the other accessory related to the correction to the first accessory confirmed in S307 and also requests for the correction processing of the optical information of the interchangeable lens 10. According to the present exemplary embodiment, in a case where the first accessory is the interchangeable lens, for example, the communication is performed by the first communication. In a case where the first accessory is the intermediate accessory, the communication is performed by the second communication.

A control unit of the first accessory which has received the correction request in S308 performs the correction processing of the optical information of the interchangeable lens 10 by using the held optical information of the other accessories related to the correction.

When the flow shifts to S309, the camera control unit 205 obtains the corrected optical information by the first accessory.

On the other hand, in S306, when the camera control unit 205 determines that the accessory where its optical information is not held by the camera control unit 205 does not exist among the interchangeable lens and the intermediate accessories in which the correction processing necessity/unnecessity information is "necessary" in S305, the flow shifts to S310. In this case, the camera control unit 205 holds the optical information of all the accessories.

When the flow shifts to S310, the camera control unit 205 performs the correction of the optical information of the interchangeable lens by using the optical information of the interchangeable lens and the optical information of the intermediate accessory which are held by the camera control unit 205 itself.

On the other hand, in S305, in a case where the camera control unit 205 determines that the intermediate accessory in which the correction processing of the optical information of the interchangeable lens is necessary does not exist, the intermediate accessory is not attached, or the correction processing necessity/unnecessity information of all the attached intermediate accessories is "unnecessary". Therefore, as the processing in a case where the correction of the optical information of the interchangeable lens is not necessary, the flow shifts to S311.

When the flow shifts to S311, the camera main body 20 determines whether or not the optical information of the interchangeable lens 10 is held on the basis of the interchangeable lens identification information obtained in S303. In a case where the camera control unit 205 does not hold the optical information of the interchangeable lens, the flow shifts to S312.

When the flow shifts to S312, the camera control unit 205 obtains the optical information of the interchangeable lens 10 from the lens control unit 113 by the first communication.

On the other hand, in S311, in a case where it is determined that the optical information of the interchangeable lens 10 is held, the camera control unit 205 obtains the optical information from a data table in the camera in S313.

After the optical information is obtained in S309, S310, S312, or S313, the flow shifts to S314, and the optical information obtaining sequence is ended.

After the optical information is obtained, the first communication path is used for the communication for the camera main body 20 to control the interchangeable lens 10, and the second communication path is used for the communication for the camera main body 20 to regularly obtain the operation information of the intermediate accessory operation member 310 and the intermediate accessory operation member 410. Either the first communication path or the second communication path may be used as the communication for regularly obtaining the operation information of the lens operation member 116 of the interchangeable lens by taking occupancies of the respective communication paths and immediacy used for the communication and the control into account.

Figure 4:
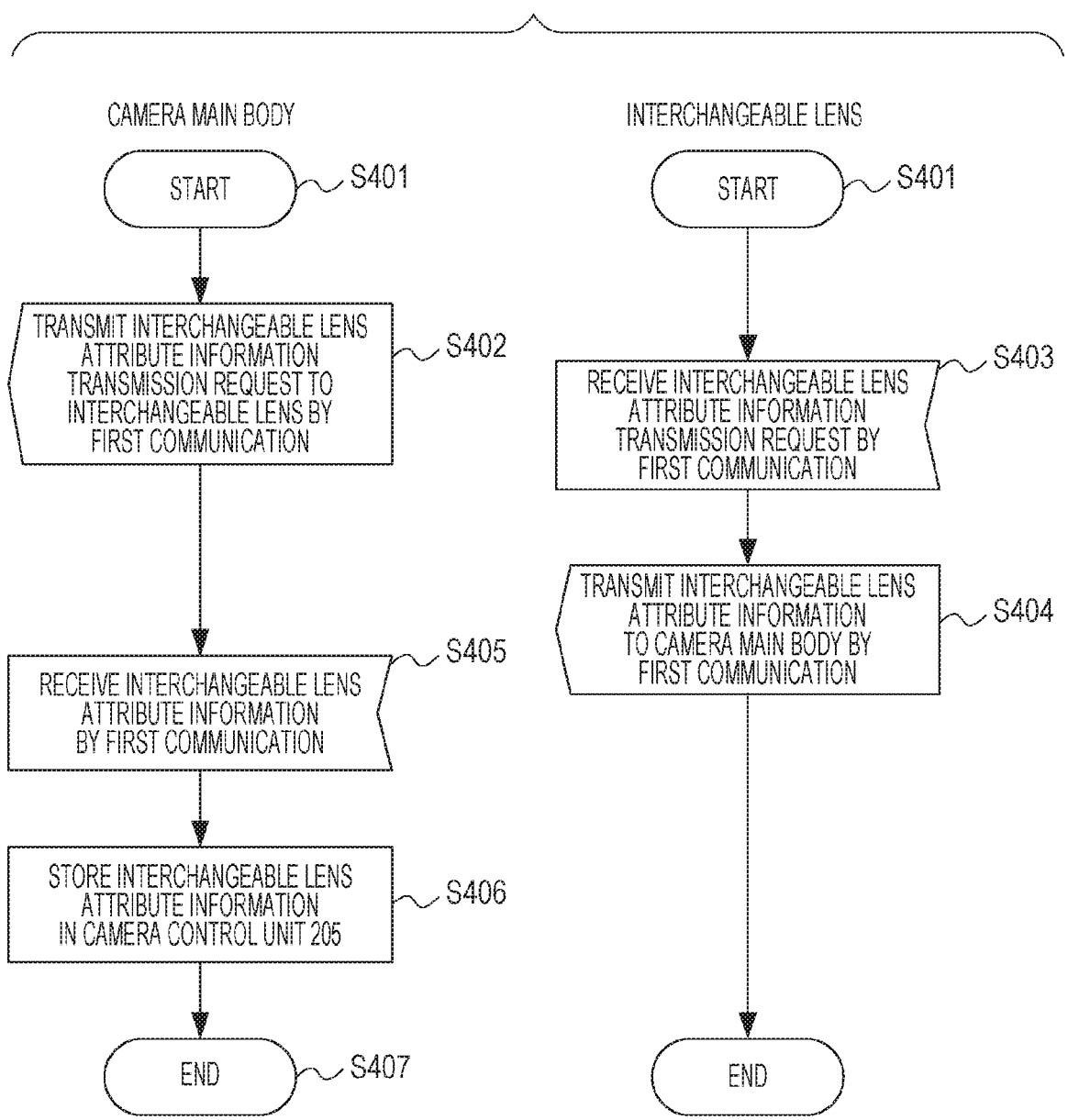
FIG. 4 is a flow chart illustrating initial communication processing of a camera and a lens according to the first exemplary embodiment.

Initial Communication Processing of the Camera and the Interchangeable Lens (FIG. 4)

FIG. 4 illustrates a flow of the sub-process S303 corresponding to the initial communication performed by the camera main body 20 with the interchangeable lens 10 in the camera system according to the first exemplary embodiment. In the initial communication, the camera control unit 205 obtains the attribute information of the interchangeable lens 10 from the lens control unit 113.

In S401, the sub-process is started, and the flow shifts to S402.

When the flow shifts to S402, the camera control unit 205 transmits an interchangeable lens attribute information transmission request to the lens control unit 113 by the first communication.

Here, the interchangeable lens attribute information transmission request according to the present exemplary embodiment will be described with reference to FIG. 10A. The interchangeable lens attribute information transmission request according to the present exemplary embodiment is information for the interchangeable lens 10 to request the camera control unit 205 to transmit two information corresponding to the attribute information. The attribute information request includes an identification information request of the interchangeable lens and an operation state information request.

In S403, when the lens control unit 113 receives the interchangeable lens attribute information transmission request, the flow shifts to S404. Then, the lens control unit 113 transmits the interchangeable lens attribute information to the camera control unit 205 by the first communication.

Here, the attribute information transmitted by the interchangeable lens 10 to the camera control unit 205 will be described with reference to FIG. 10B. The attribute information includes the identification information and the operation state information.

In S405, the camera control unit 205 receives the interchangeable lens attribute information, and the flow shifts to S406 where the received interchangeable lens attribute information is stored.

The sub-process S303 ends in S407.

Figure 5:
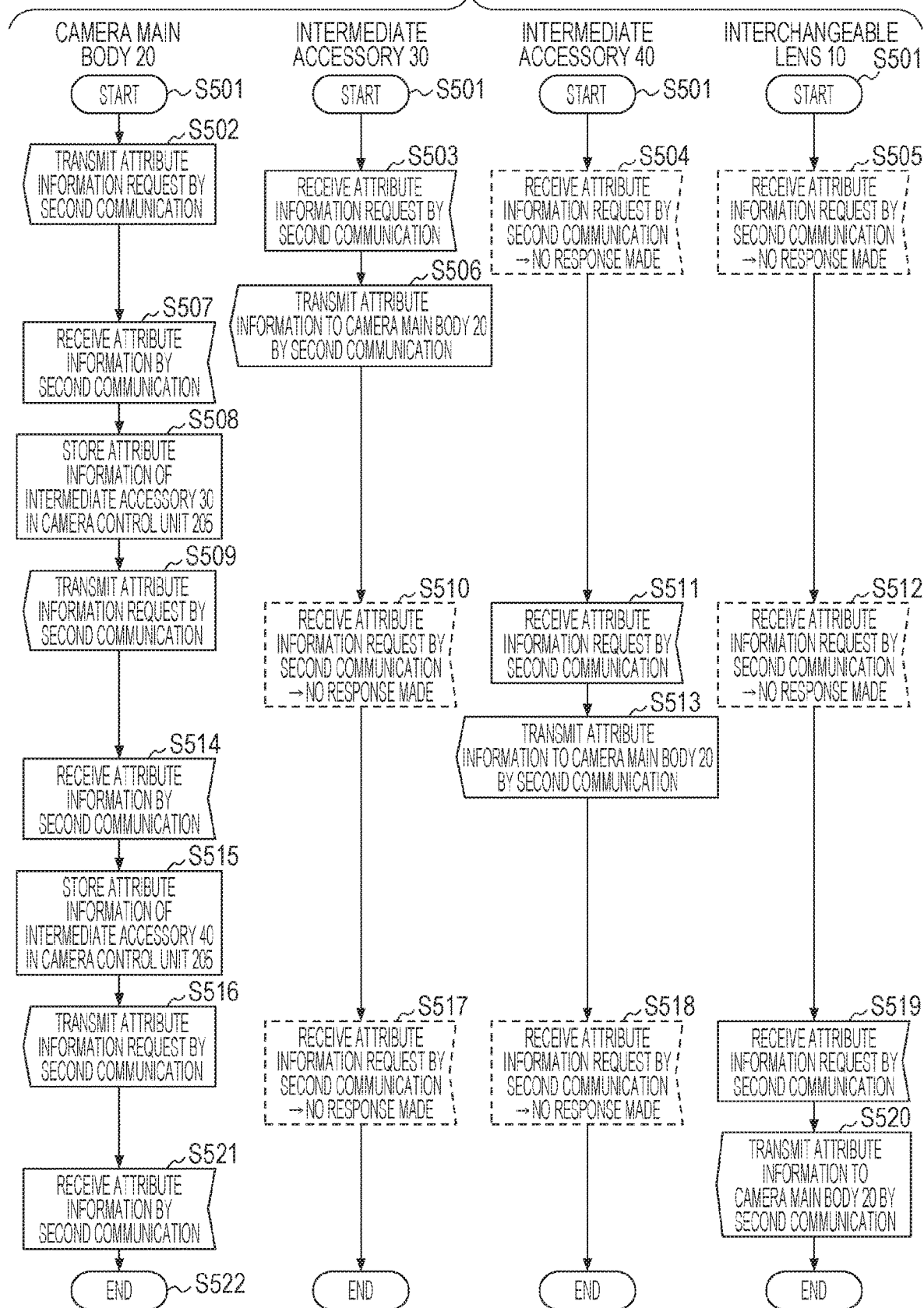
FIG. 5 is a flow chart illustrating initial communication processing of the camera and an accessory according to the first exemplary embodiment.

Initial Communication Processing of the Camera and the Intermediate Accessory (FIG. 5)

FIG. 5 is an explanatory diagram for describing a flow of the sub-process S304 corresponding to the initial communication processing performed by the camera main body 20 and the accessory in the camera system according to the first exemplary embodiment. In the initial communication, the camera control unit 205 obtains the accessory attribute information. The attribute information will be described below.

In S501, when the sub-process is started, the flow shifts to S502.

When the flow shifts to S502, the camera control unit 205 transmits an attribute information request to the intermediate accessory control unit 309 by the second communication.

Here, the attribute information request according to the present exemplary embodiment will be described with reference to FIG. 10C. The attribute information request according to the present exemplary embodiment is information for the accessory to request the camera control unit 205 for transmission of four pieces of information corresponding to the attribute information. The attribute information request includes an accessory identification information request, an operation state information request, a correction processing necessity/unnecessity information request, and a termination information request.

In S503, when the intermediate accessory control unit 309 receives the attribute information request, the flow shifts to S506.

In S506, the intermediate accessory control unit 309 transmits the attribute information of the intermediate accessory 30 to the camera control unit 205 by the second communication.

Here, the attribute information transmitted by the intermediate accessory to the camera control unit 205 will be described with reference to FIG. 10D. The attribute information includes the identification information, the operation state information, the correction processing necessity/unnecessity information, and the termination information.

The correction processing necessity/unnecessity information is information indicating "necessary" when the intermediate accessory is to change the optical characteristics. When the intermediate accessory is not to change the optical characteristics, the correction processing necessity/unnecessity information is information indicating "unnecessary".

According to the present exemplary embodiment, termination information refers to information indicating whether or not the accessory is a termination of the second communication as viewed from the camera main body 20. When the intermediate adapter is the termination of the second communication as viewed from the camera main body 20, the termination information is information indicating that "here is the termination". When the accessory is not the termination of the second communication as viewed from the camera main body 20, the termination information is information indicating that "here is not the termination".

In the one-to-multi communication such as the second communication, for example, it is possible to specify the transmission destination by adding the identification information of the accessory to the beginning of the communication data or the like. However, since the camera control unit 205 does not have any information of the accessory in the stage of S502, the specification of the transmission destination based on the communication data is not performed.

In view of the above, an example of a method for the camera main body 20 to sequentially communicate with the plurality of accessories in the present sub-process includes a method of using the second communication connection switch 311 and the second communication connection switch 411 as will be described below. It is assumed that the second communication connection switch 311 and the second communication connection switch 411 are short-circuited in a static state.

In S501, the camera control unit 205 transmits this sub-process start information by the second communication. Since the second communication connection switch 311 and the second communication connection switch 411 are short-circuited, the respective accessories receive the present sub-process start information. The respective intermediate accessories that have received the present sub-process start information release their own second communication connection switches. With this configuration, a state is established in which only the intermediate accessory control unit 309 is connected to the camera control unit 205, and it is possible to receive the data transmitted by the camera control unit 205. When the intermediate accessory control unit 309 that has ended the processing with respect to the received data short-circuits the second communication connection switch 311, the intermediate accessory control unit 409 can receive the data transmitted by the camera control unit 205. The intermediate accessory 30 that has short-circuited the second communication connection switch does not respond to the transmission information of the camera control unit 205 until reception of end information of the present sub-process which is transmitted by the camera control unit 205 in S522 where the present sub-process ends.

It should be noted that even in a case where the intermediate accessory 30 operates in the safe mode according to the present exemplary embodiment, the camera main body 20 and the intermediate accessory 30 do not end this sub-process and do perform the initial communication with the accessory connected via the intermediate accessory 30. However, in a case where the accessory operating in the safe mode is attached, it is sufficient even when the initial communication with the attached accessory is not performed via the accessory. For example, when the operation state of the intermediate accessory 30 is the safe mode, the intermediate accessory control unit 309 does not short-circuit the second communication connection switch 311 even when the processing with respect to the received data is ended. Then, this sub-process may be immediately ended by transmitting the attribute information as the terminal information indicating "here is the termination" to the camera control unit 205.

Since the intermediate accessory 40 also takes the similar behavior, the camera control unit 205 can sequentially communicate with the plurality of accessories.

In S504 and S505, since the second communication connection switch 311 is open, the intermediate accessory 40 and the lens control unit 113 do not receive the information transmission request transmitted from the camera control unit 205 in S502.

In S506, the intermediate accessory control unit 309 transmits the attribute information of the intermediate accessory 30 to the camera control unit 205 by the second communication. Subsequently, the second communication connection switch 311 is short-circuited. With this configuration, the intermediate accessory control unit 409 can receive the data transmitted by the camera control unit 205.

In S507, the camera control unit 205 receives the attribute information of the intermediate accessory 30, and the flow shifts to S508. Subsequently, the received attribute information is stored. 100157j As described above, the attribute information of the intermediate accessory 30 is obtained in S502 to S508, and the flow shifts to S509. In S509, S511, and S513 to S515, the camera control unit 205 obtains the attribute information of the intermediate accessory 40 similarly as in S502, S503, and S506 to S508.

In S510, the intermediate accessory control unit 309 receives the attribute information request transmitted by the camera control unit 205, but no response is made since the end information of the present sub-process is not received.

Since the second communication connection switch 411 is open in S512 similarly as in S504 and S505, the lens control unit 113 does not receive the information transmission request transmitted from the camera control unit 205 in S509.

The first exemplary embodiment relates to an example in which total three accessories including one interchangeable lens and two intermediate accessories are connected, but only one intermediate accessory may be connected, or three or more intermediate accessories may be connected. Since any number of intermediate accessories may be attached, the information obtaining processing of the accessory is preferably ended by obtaining the termination information of the accessory.

The termination information of the accessory may be obtained by another method. For example, similarly as in S502 and S509, when the camera control unit 205 transmits the attribute information request while it is assumed that the intermediate accessory is attached, it may be notified that this is the interchangeable lens on the basis of the termination information returned from the second communication unit 115. In addition, the intermediate accessory 40 may notify the camera main body 20 in S513 by detecting that the intermediate accessory 40 itself is the termination on the basis of a connection state of a terminal which is not illustrated in the drawings or the like. According to the present exemplary embodiment, a case will be described in which the notification of the termination information is performed when the lens control unit 113 replies the attribute information including the termination information to the attribute information request from the camera control unit 205.

In S516, the camera main body 20 transmits the attribute information request by the second communication similarly as in S502 and S509. In S517 and S518, the intermediate accessory 30 and the intermediate accessory 40 do not make a response since the end information of the present sub-process is not received similarly as in S510.

In S519, the lens control unit 113 receives the attribute information request, and the flow shifts to S520 where the attribute information is transmitted to the camera control unit 205 by the second communication.

Here, the attribute information transmitted by the lens control unit 113 to the camera control unit 205 will be described with reference to FIG. 10E. The attribute information includes the identification information, the operation state information, the correction processing necessity/unnecessity information, and the termination information.

Since the interchangeable lens 10 is not the intermediate accessory, the correction of the optical information of the interchangeable lens 10 does not become necessary by the attachment. Therefore, the correction processing necessity/unnecessity information is information indicating that the correction processing is unnecessary.

Since the interchangeable lens 10 according to the present exemplary embodiment is the termination of the second communication as viewed from the camera main body 20, the termination information is information indicating that the interchangeable lens 10 is the termination of the second communication.

In S521, the camera control unit 205 obtains the attribute information, and the flow shifts to S522 where the series of initial communication processing ends.

It should be noted that the correction processing necessity/unnecessity information is preferably obtained to shorten the communication processing as in the present exemplary embodiment. However, in a case where the correction processing necessity/unnecessity information is not exchanged, it is determined that the correction processing is necessary in all the intermediate accessories.

The sub-process S304 ends in S522.

According to the present exemplary embodiment, the processing using the method of sequentially communicating with the plurality of accessories by using the second communication connection switch has been described. It should be noted however that another method may also be used as long as it is possible to perform the communication with the plurality of accessories. For example, when a voltage level of a terminal itself to which the accessory is connected which is not illustrated in the drawings is detected, it is possible to understand to which position the accessory is attached from the camera main body side. In the above-described case, the number of the information transmission requests transmitted from the camera is counted, and the information is transmitted to the camera main body only when the count is matched with its own attachment order.

Figure 6:
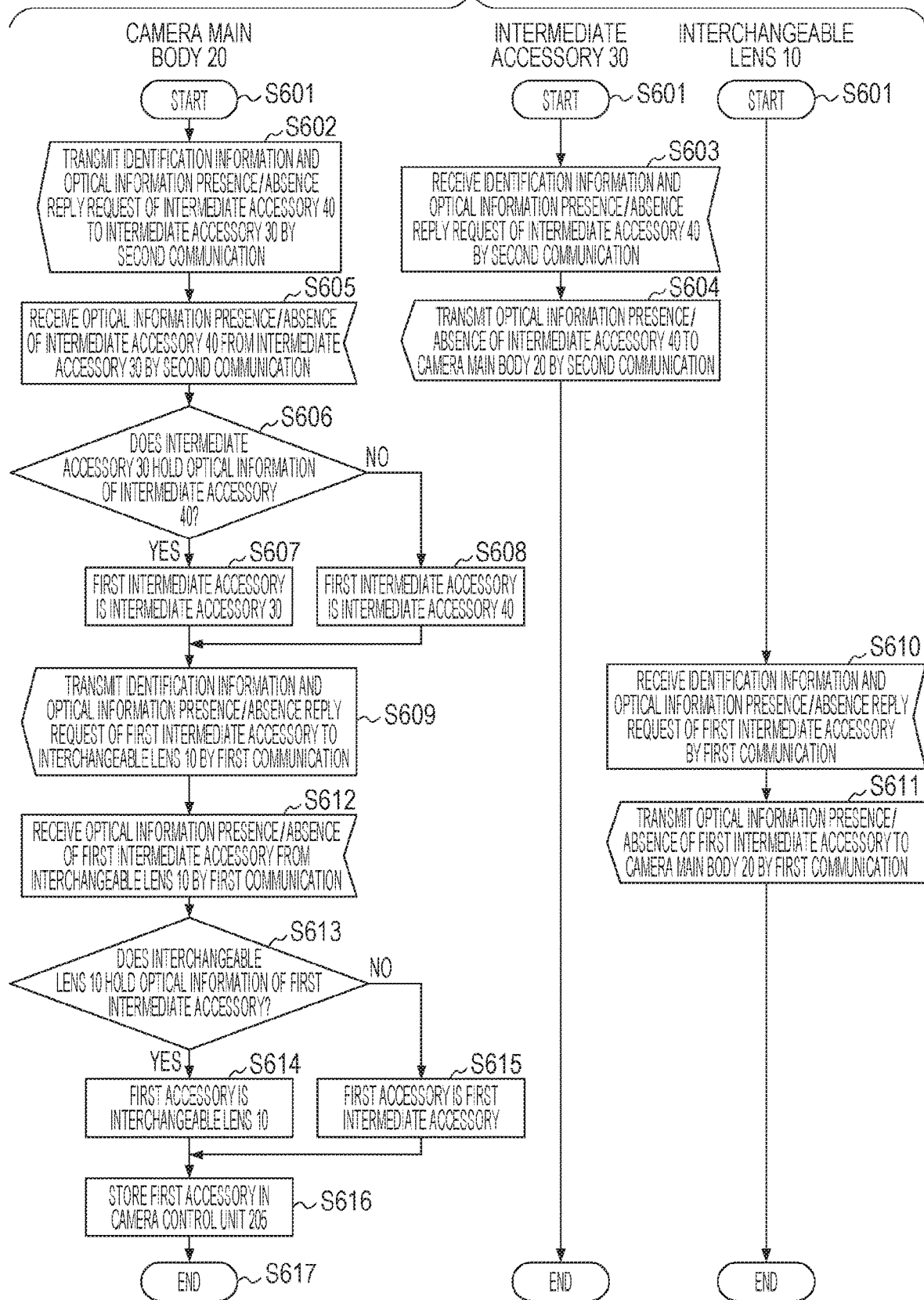
FIG. 6 is a flow chart illustrating a flow of processing for deciding a first accessory according to the first exemplary embodiment.

Sub-Process S307 for Deciding the First Accessory (FIG. 6)

According to the first exemplary embodiment, a flow of the sub-process S307 for the camera main body 20 to search for the first accessory among the accessories related to the correction by the communication will be described with reference to FIG. 6.

FIG. 6 illustrates a flow of the sub-process S307 for the camera control unit 205 to decide the first accessory among the accessories related to the optical correction in the camera system according to the first exemplary embodiment. Herein, the camera control unit 205 does not hold the optical information of the interchangeable lens 10, the intermediate accessory 30, and the intermediate accessory 40. In addition, both the correction processing necessity/unnecessity information of the intermediate accessory 30 and the correction processing necessity/unnecessity information of the intermediate accessory 40 are set as "necessary".

The sub-process starts in S601, and the flow shifts to S602.

When the flow shifts to S602, the camera control unit 205 transmits the identification information of the intermediate accessory 40 and a presence/absence reply request of the optical information to the intermediate accessory control unit 309 by the second communication and enquires whether or not the optical information of the intermediate accessory 40 is held. As a method of specifying the transmission destination, for example, the identification information of the intermediate accessory may be added to the beginning of the communication data in transmission data, and the accessory may refer to a value of the beginning of the communication data to determine whether or not this is the communication addressed to itself.

In S603, the intermediate accessory control unit 309 receives the identification information of the intermediate accessory 40 and the presence/absence reply request of the optical information, and the flow shifts to S604.

In S604, the intermediate accessory control unit 309 transmits information on whether or not the optical information of the intermediate accessory 40 is held to the camera control unit 205 by the second communication.

In S605, the camera control unit 205 receives the information on the presence or absence of the optical information of the intermediate accessory 40 from the intermediate accessory 30, and the flow shifts to S606.

In S606, the camera control unit 205 determines the intermediate accessory (also referred to as a first intermediate accessory) including the optical information of the other intermediate accessory.

In a case where the intermediate accessory control unit 309 holds the optical information of the intermediate accessory 40, the flow shifts to S607, and the camera control unit 205 determines that the intermediate accessory 30 is the first intermediate accessory.

In a case where the intermediate accessory control unit 309 does not hold the optical information of the intermediate accessory 40, the flow shifts to S608. The camera control unit 205 determines that the intermediate accessory 40 is the first intermediate accessory, and the optical information of the intermediate accessory 30 is held.

Even in a case where three or more intermediate accessories are attached, it is possible to similarly decide the first intermediate accessory. For example, in a case where three accessories are attached, the processing similar to S602 to S605 is performed between two accessories among the three accessories. When the first intermediate accessory is found, the flow shifts to S609.

When the flow shifts to S609, the camera control unit 205 transmits the identification information of the first intermediate accessory decided in S607 or S608 and a presence/absence reply request (third instruction information) of the optical information (fourth information) to the lens control unit 113 by the first communication. In other words, an enquiry on whether or not the optical information of the first intermediate accessory is held in the interchangeable lens is issued.

In S610, when the lens control unit 113 receives the identification information of the first intermediate accessory and the optical information presence/absence reply request, the flow shifts to S611, and the information on whether or not the optical information of the first intermediate accessory is held is transmitted to the camera control unit 205 by the first communication.

In S612, the camera control unit 205 receives the presence or absence of the optical information of the first intermediate accessory from the interchangeable lens 10, and the flow shifts to S613. It is determined whether or not the lens control unit 113 holds the optical information of the first intermediate accessory. With this configuration, the first accessory is determined.

In a case where the camera control unit 205 determines that the lens control unit 113 holds the optical information of the first intermediate accessory, the flow shifts to S614. In S614, it is determined that the interchangeable lens 10 is the first accessory, and the optical information of the intermediate accessory 30 and the optical information of the intermediate accessory 40 are held in the interchangeable lens. In a case where the camera control unit 205 determines that the lens control unit 113 does not hold the optical information of the first intermediate accessory, the flow shifts to S615.

In S615, the camera control unit 205 determines that the first intermediate accessory is the first accessory.

When the first accessory is confirmed in S614 or S615, the flow shifts to S616, and the camera control unit 205 stores the identification information and an accessory type of the first accessory. When the first accessory is stored, the flow shifts to S617, and the sub-process S307 ends.

Advantages of the First Exemplary Embodiment

As described above, according to the first exemplary embodiment, the first communication path in which the camera and the interchangeable lens can perform the communication and the second communication path in which the camera and the accessory can perform the communication are independently included. Subsequently, the unit that corrects the optical information of the interchangeable lens is decided on the basis of the identification information of each of the units obtained by the communication using the respective communication paths and the correction processing necessity/unnecessity information of the intermediate accessory. With this configuration, while the optical information of the interchangeable lens is appropriately corrected, it is possible to perform the communication at the more appropriately intended timing between the respective units of the imaging apparatus, the interchangeable lens, and the intermediate accessory.

Second Exemplary Embodiment

According to the first exemplary embodiment, the method of correcting the optical information of the interchangeable lens on the basis of the optical information of the intermediate accessory in the activation sequence immediately after the interchangeable lens is attached has been described. According to a second exemplary embodiment, a method of correcting the optical information of the interchangeable lens in a case where the optical system of the accessory dynamically changes when the operation member included in the accessory is operated will be described.

Examples in which the optical system of the accessory dynamically changes when the operation member included in the intermediate accessory is operated include the magnification varying lens in which a magnification is variable, an ND filter in which a transmittance is variable, and the like.

According to the second exemplary embodiment, when the interchangeable lens is attached and the current optical system is confirmed, the processing described according to the first exemplary embodiment is executed. With this configuration, it is assumed that the camera control unit 205 understands the unit that holds the optical information of all the accessories among the interchangeable lens 10, the camera main body 20, the intermediate accessory 30, and the intermediate accessory 40.

In addition, it is assumed that the camera control unit 205 recognizes the accessory in which the optical system may dynamically change on the basis of the identification information of the accessory obtained by the operation as described according to the first exemplary embodiment.

Hereinafter, an accessory in which the optical information dynamically changes and the correction processing necessity/unnecessity information is "necessary" will be represented as a dynamic accessory. An intermediate accessory in which the optical information does not dynamically change and the correction processing necessity/unnecessity information is "unnecessary" will be referred to as a static intermediate accessory. An interchangeable lens in which the optical information dynamically changes will be referred to as a dynamic lens, and an interchangeable lens in which the optical information does not dynamically change will be referred to as a static lens.

It should be noted that the example in which the intermediate accessory 30 and the intermediate accessory 40 are attached between the camera main body 20 and the interchangeable lens 10 will be described according to the present exemplary embodiment, but the present exemplary embodiment can also be adopted even in a case where only one of the intermediate accessories is attached.

Figure 7:
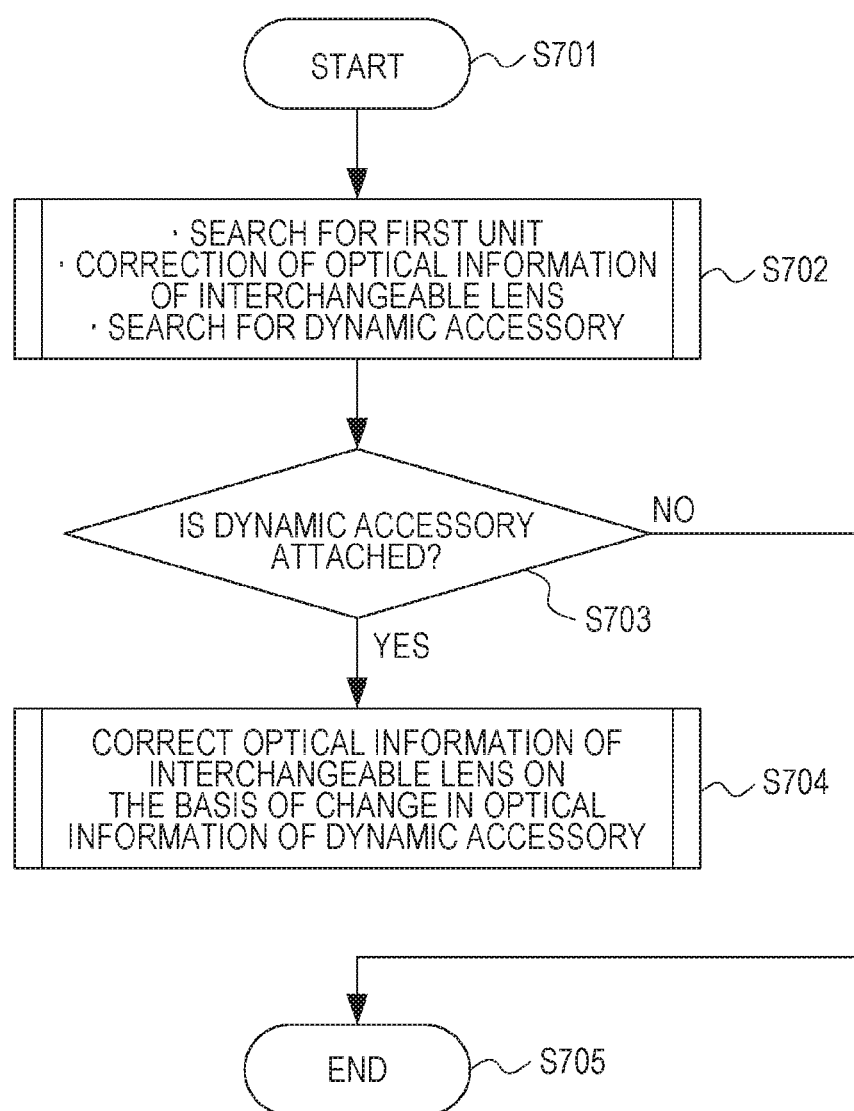
FIG. 7 is a flow chart illustrating a flow of processing for searching for a dynamic accessory according to a second exemplary embodiment.

Dynamic Accessory Search Processing (FIG. 7)

FIG. 7 illustrates a relationship between the first exemplary embodiment and the present exemplary embodiment. In S701, the camera system is activated, and the flow shifts to S702.

In S702, the camera control unit 205 executes the processing described with reference to FIG. 3. That is, for example, the initial communication, the decision of the first unit, and the correction of the optical information of the interchangeable lens are executed. In this initial communication, information corresponding to whether or not the optical system dynamically changes (will be also referred to as dynamic accessory information) is obtained from the interchangeable lens 10 and the intermediate accessories 30 and 40. For example, with regard to the information on whether or not the optical system dynamically changes, a transmission request is transmitted to the accessory from the camera control unit 205 at a timing when the identification information is obtained in S402 of FIG. 4 or S502 or S509 of FIG. 5, and the accessory transmits the dynamic accessory information in accordance with the transmission request. A configuration may also be adopted in which the attribute information is included in the dynamic accessory information, and the camera control unit 205 may obtain the attribute information including the dynamic accessory information as a response with respect to the transmission request of the attribute information which has been transmitted to the accessory by the camera control unit 205. It should be noted that the camera control unit 205 may also determine whether or not this is the dynamic accessory on the basis of the identification information of the accessory which is obtained in S702 without separately obtaining the dynamic accessory information. In this case, a configuration may also be adopted in which the memory (not illustrated) of the camera control unit 205 includes information (such as a table) indicating a correspondence relationship between the identification information of the accessory and information corresponding to whether or not the optical system dynamically change. According to this, the camera control unit 205 can determine whether or not the accessory is the dynamic accessory on the basis of the identification information of the accessory.

When the sub-process S702 is ended, the flow shifts to S703.

In S703, the camera control unit 205 determines whether or not the dynamic accessory is attached on the basis of the above-described dynamic accessory information. More specifically, in a case where the information indicating that the optical system dynamically changes is obtained as the dynamic accessory information from any one of the accessories, the camera control unit 205 determines that the dynamic accessory is attached. On the other hand, in a case where the information indicating that the optical system dynamically changes is not obtained as the dynamic accessory information, the camera control unit 205 determines that the dynamic accessory is not attached. When the dynamic accessory is attached, the flow shifts to S704.

In S704, the camera control unit 205 executes the sub-process for correcting the optical information of the interchangeable lens on the basis of the change of the optical information of the dynamic accessory. Since the optical information of the interchangeable lens does not need to be corrected in a case where the dynamic accessory is not attached or a case where the dynamic accessory is not operated, the flow shifts to S705, and the optical correction processing of the interchangeable lens is ended. Optical information correction processing in accordance with the operation of the dynamic accessory (FIG. 8)

Hereinafter, the sub-process S704 for correcting the optical information of the interchangeable lens on the basis of the change of the optical information in accordance with the operation of the dynamic accessory according to the second exemplary embodiment of the present disclosure will be described with respect to FIG. 8.

Figure 8:
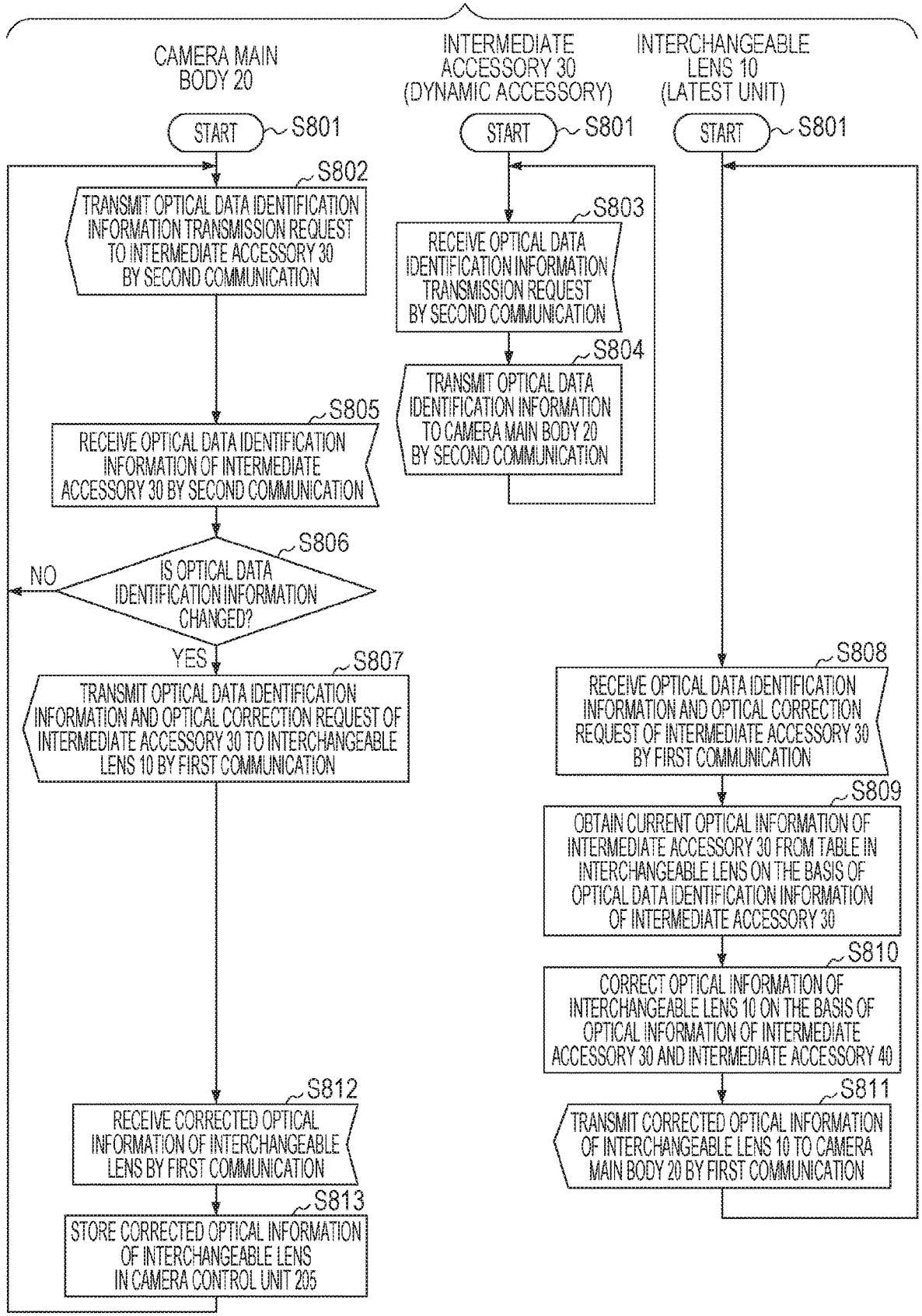
FIG. 8 is a flow chart illustrating a flow of correction processing of optical information in accordance with an operation of the dynamic accessory according to the second exemplary embodiment.

In the sub-process illustrated in FIG. 8, the descriptions will be provided while it is assumed that the intermediate accessory 30 is the dynamic accessory, the interchangeable lens 10 is the first unit and also the static lens, and the intermediate accessory 40 is the static intermediate accessory. That is, the camera control unit 205 and the lens control unit 113 recognize as described above in S702 of FIG. 7.

The sequence starts in S801, and the flow shifts to S802.

In S802, the camera control unit 205 transmits the optical data identification information transmission request to the intermediate accessory control unit 309 of the intermediate accessory 30 corresponding to the dynamic accessory by the second communication.

In S803, when the intermediate accessory control unit 309 receives the optical data identification information transmission request, the flow shifts to S804, and optical data identification information is transmitted to the camera control unit 205 by the second communication.

It should be noted that the optical data identification information of the dynamic accessory is information related to a parameter for the correction of the optical information of the interchangeable lens 10 and is, for example, current optical information according to the present exemplary embodiment. For example, in a case where the intermediate accessory includes the magnification varying lens, the information is current magnification information. In a case where, for example, the intermediate accessory includes the ND filter, the information is information for correcting a current optical path length. It should be noted that other information may be used as the optical data identification information as long as the first unit can recognize an optical state of the dynamic accessory. In addition, the information may be information obtained by adding information of a plurality of possible states to the information such as the model number (ID) used for identifying the type (model) or may be optical data identification information indicating the optical data that dynamically changes. Moreover, the information may also include information indicating a function that the accessory has or information such as a manufacturing number (serial number) with which it is possible to identify an individual piece among the same model.

In S805, the camera control unit 205 receives the optical data identification information, and the flow shifts to S806.

In S806, the camera control unit 205 determines if the optical information of the intermediate accessory 30 is changed on the basis of the optical data identification information. For example, the optical information of the intermediate accessory 30 which has been received in the initial communication in S702 is compared with the optical data identification information received in S805. In a case where the optical information is not changed, the flow returns to S802. After elapse of a predetermined period of time, the camera control unit 205 transmits the optical data identification information transmission request again.

In S806, in a case where the camera control unit 205 determines that the optical information of the intermediate accessory 30 is changed, the flow shifts to S807 where processing for correcting the optical information of the optical lens is performed.

It should be noted that, as a method for the camera control unit 205 to recognize the change of the optical information of the dynamic accessory, the presence or absence of the change of the optical information may be received by way of polling by performing the communication with the dynamic accessory at a constant cycle as in S802, S803, S804, S805, and S806.

In addition, an interruption signal from the dynamic accessory may be received when the optical information of the dynamic accessory changes. For example, it is assumed that the intermediate accessory 30 corresponding to the dynamic accessory includes an operation member configured to change the optical information of the intermediate accessory 30. In this case, when it is detected that the operation member is operated, the interruption signal may be transmitted from the intermediate accessory control unit 309 which will be described below to the camera control unit 205. In addition, S802, S803, S804, and S805 described above may be executed after the camera control unit 205 receives the interruption signal from the intermediate accessory control unit 309 and determines that the optical data identification information is changed in S806.

The optical data identification information on which the change has been reflected may be exchanged as in S802, S803, S804, and S805. The camera control unit 205 may also be notified of only the change of the optical data identification information, and the camera control unit 205 may calculate the current optical data identification information and start the exchange.

When the flow shifts to S807, the camera control unit 205 transmits the optical data identification information of the intermediate accessory 30 and the correction request of the optical information of the interchangeable lens 10 (will be also referred to as an optical correction request) to the lens control unit 113 of the interchangeable lens 10 which serves as the first unit by the first communication.

In S808, when the lens control unit 113 receives the optical data identification information of the intermediate accessory 30 and the optical correction request, the flow shifts to S809.

In S809, the lens control unit 113 obtains the current optical information of the intermediate accessory 30 from the table in the lens control unit 113 on the basis of the optical data identification information of the intermediate accessory 30, and the flow shifts to S810.

In S810, the optical information of the interchangeable lens 10 is corrected on the basis of the optical information of the intermediate accessory 40 corresponding to the static intermediate accessory which is obtained in the sub-process S702 and the optical information of the intermediate accessory 30.

When the correction is completed, in S811, the lens control unit 113 transmits the corrected optical information of the interchangeable lens 10 to the camera control unit 205 by the first communication.

In S812, the optical information of the interchangeable lens which is corrected by the camera control unit 205 is received, and the flow shifts to S813 where the optical information is stored in the camera control unit 205.

When S813 is ended, the flow returns to S802, and the change of the optical information of the dynamic accessory is monitored again.

According to the present exemplary embodiment, the case has been described where one of the intermediate accessories is the dynamic accessory, and the intermediate accessory 10 is the first unit. The correction processing can also be similarly performed in a case where a plurality of dynamic accessories are used and a case where the first unit is a unit other than the interchangeable lens.

In a case where only the first unit is the dynamic accessory, when the first unit recognizes that effect, the optical correction may be performed in a stage where the first unit recognizes that its own optical information is changed, and the optical data of the interchangeable lens 10 after the optical correction may be transmitted to the camera main body 20.

The correction processing of the optical information of the interchangeable lens 10 is performed by taking into account not only the optical information of the dynamic accessory which is obtained in S805 but also the optical information of the static intermediate accessory as in the optical information of the intermediate accessory 40 in S810. In a case where the static intermediate accessory is attached, the correction may be previously performed on the basis of the optical information of the static intermediate accessory, and the final correction processing may be performed on the basis of the optical information of the dynamic accessory when the optical information dynamically changes.

Advantages of the Second Exemplary Embodiment

As described above, according to the second exemplary embodiment, the change of the optical information of the intermediate accessory 30 is detected by the camera control unit 205. Then, the camera main body 20 transmits the information related to the change of the optical information and the correction request of the optical information of the interchangeable lens 10 to the lens control unit 113. Subsequently, the lens control unit 113 corrects the optical information of the interchangeable lens 10 to be transmitted to the camera control unit 205.

With this configuration, even in a case where the optical information of the accessory dynamically changes, it is possible to appropriately correct the optical information of the interchangeable lens.

Third Exemplary Embodiment

According to the first exemplary embodiment, the case has been described where the first unit that performs the correction of the optical information of the interchangeable lens is decided when the camera control unit 205 determines the presence or absence of the optical information of the unit on the basis of the identification information of the unit. According to a third exemplary embodiment, a case where the unit that performs the correction of the optical information of the interchangeable lens is previously decided will be described.

An example in which the unit that performs the correction of the optical information of the interchangeable lens is previously decided includes the following case. That is, for example, when the attachment of the accessory where its optical information is not held by the camera is detected on the basis of the identification information of the accessory, the camera requests a user for firmware update, and the optical information of the accessory is obtained by the firmware update. In this case, the camera performs the correction of the optical information of the interchangeable lens.

According to the third exemplary embodiment, it is previously decided that the camera performs the correction of the optical information of the interchangeable lens. Even in a case where it is previously decided that the interchangeable lens or a particular intermediate accessory preforms the correction of the optical information of the interchangeable lens, processing similar to the third exemplary embodiment may be performed.

In addition, in a case where the optical characteristics of the accessory dynamically changes as in the second exemplary embodiment, it is possible to reduce the communication amount by setting the accessory as the unit that performs the correction of the optical information of the interchangeable lens.

Figure 9:
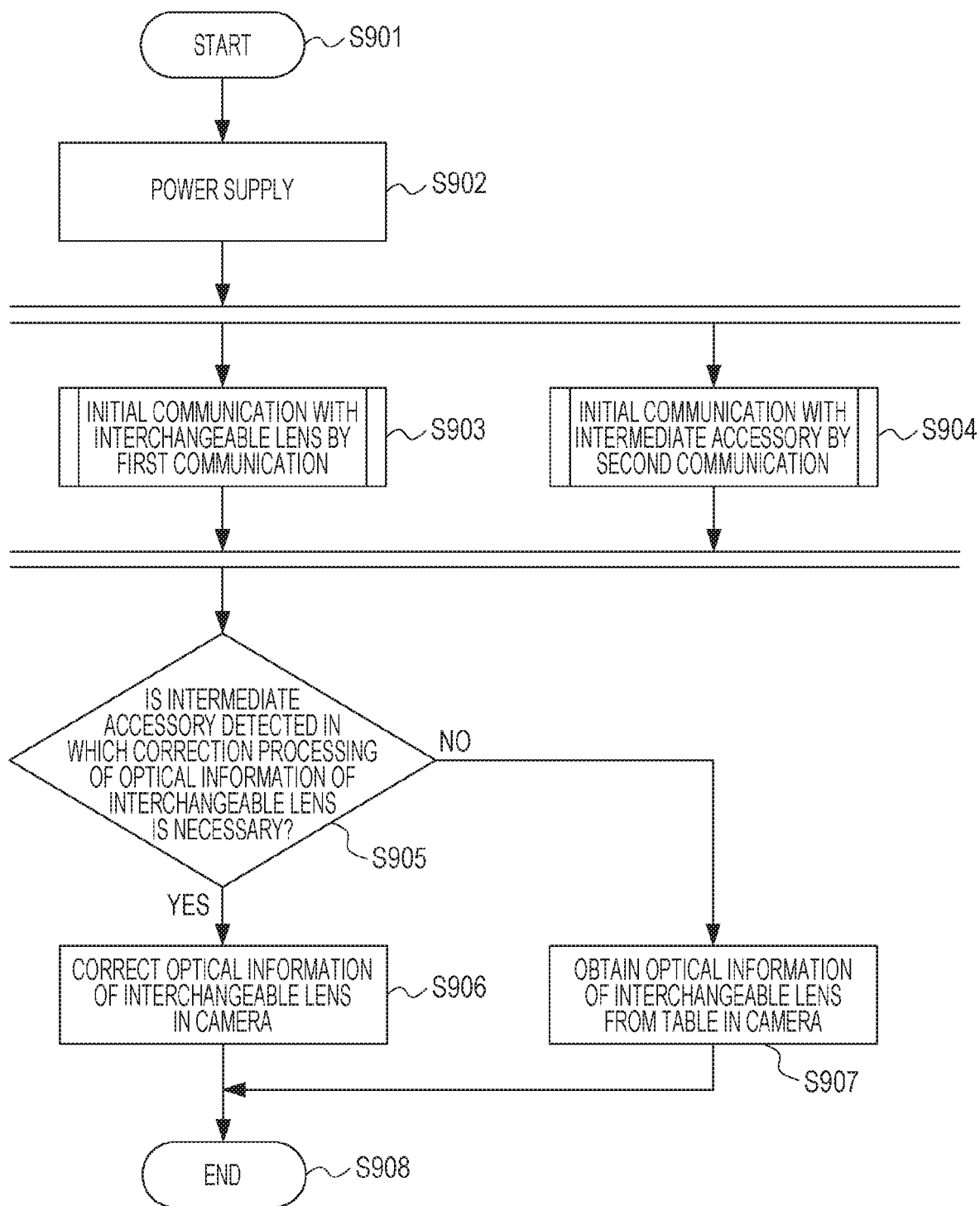
FIG. 9 is a flow chart illustrating a flow of processing for obtaining the optical information according to a third exemplary embodiment.

Corrected Optical Information Obtaining Processing According to the Third Exemplary Embodiment (FIG. 9)

FIG. 9 illustrates a flow of processing for the camera main body 20 to obtain the optical information of the interchangeable lens 10 which has been corrected on the basis of the optical information of the intermediate accessory 30 and the intermediate accessory 40 when power is supplied for the first time since the intermediate accessory and the interchangeable lens are attached.

In S901, the camera main body 20 is activated, and the flow shifts to S902.

When the flow shifts to S902, the camera main body 20 supplies power to the interchangeable lens 10, the intermediate accessory 30, and the intermediate accessory 40 via the mount contact points for the power supply which are not illustrated in the drawings, and the flow shifts to S903 and S904.

The sub-process S903 corresponding to the initial communication processing with the interchangeable lens 10 by the first communication is similar to the sub-process S303 according to the first exemplary embodiment. The sub-process S904 corresponding to the initial communication processing with the accessory by the second communication is similar to the sub-process S304 according to the first exemplary embodiment.

S903 and S904 may be performed in parallel or may also be sequentially performed since the different communication paths are used.

The identification information of the interchangeable lens and the attribute information of the accessory are obtained in S903 and S904, and the flow shifts to S905.

When the flow shifts to S905, the camera control unit 205 determines whether or not the intermediate accessory in which the correction processing of the optical information of the interchangeable lens is necessary exists on the basis of the identification information of the intermediate accessory which is obtained in S904. In a case where the intermediate accessory in which the correction processing of the optical information of the interchangeable lens is necessary is attached, the flow shifts to S906.

When the flow shifts to S906, the camera control unit 205 performs the correction of the optical information of the interchangeable lens by using the optical information of the interchangeable lens and the optical information of the intermediate accessory which are held by itself.

On the other hand, in S905, in a case where the intermediate accessory is not attached or all the attached intermediate accessories are the intermediate accessories in which the correction processing of the optical information of the interchangeable lens is unnecessary, the flow shifts to S907 since the correction processing is unnecessary.

In S907, the camera control unit 205 obtains the optical information from the data table stored by itself.

After the optical information is obtained in S906 or S907, the flow shifts to S908, and the optical information obtaining sequence is ended.

As described above, in the camera system independently including the first communication path in which the camera and the interchangeable lens can perform the communication and the second communication path in which the camera and the intermediate accessory can perform the communication, it is possible to appropriately correct the optical information of the interchangeable lens on the basis of the optical information of the intermediate accessory.

Similarly, the interchangeable lens may previously decide that the correction of its own optical information is performed on the basis of the information of the intermediate accessory. In the above-described case, the camera may obtain only the identification information of the intermediate accessory in the initial communication and notifies the interchangeable lens of the identification information. The interchangeable lens that has received the notification determines whether or not the correction of the optical information can be performed on the basis of the identification information of the intermediate accessory.

In a case where the correction can be performed, the camera is notified of the corrected optical information of the interchangeable lens. In a case where the correction is not performed, the camera is notified of that effect, and the camera that has received the notification takes a predetermined action for urging the user to perform firmware update of the interchangeable lens, for example. In this manner, it is possible to appropriately correct the optical information of the interchangeable lens on the basis of the optical information of the intermediate accessory.

After the optical information is obtained, the first communication path is used for the communication for the camera main body 20 to control the interchangeable lens 10, and the second communication path is used for the camera main body 20 to regularly obtain the operation information of the intermediate accessory operation member 310 and the intermediate accessory operation member 410. Either the first communication path or the second communication path may be used as the communication for regularly obtaining the operation information of the lens operation member 116 of the interchangeable lens by taking the occupancies of the respective communication paths and the immediacy used for the communication and the control into account.

Advantages of the Third Exemplary Embodiment

As described above, according to the exemplary embodiment, the correction of the optical information of the interchangeable lens 10 is performed in the camera main body 20. That is, it is unnecessary to determine by which unit the correction of the optical information is to be performed according to the third exemplary embodiment. For this reason, according to the third exemplary embodiment, the processing time can be shortened as compared with the first exemplary embodiment.

Fourth Exemplary Embodiment

According to the present exemplary embodiment, descriptions will be provided while focus is on a case where the optical data identification information indicating the optical data intrinsic to the accessory is used as the intermediate accessory identification information.

In a case where the intermediate accessory identification information is information intrinsic to the product such as the model number (ID), when a newly-introduced accessory has an optical system similar to an already-available accessory or even the accessory can be corrected by a correction method similar to that for the already-available accessory, a new model number is allocated. For this reason, in a case where necessity/unnecessity of the correction of the optical information of the interchangeable lens is determined on the basis of the model number (ID) or the like, when the model number (ID) is not yet found, the optical information of the lens is not to be corrected by taking the optical characteristics of the above-described accessory into account.

In view of the above, according to the present exemplary embodiment, optical data identification information is used as the intermediate accessory identification information. According to the present exemplary embodiment, the intermediate accessory identification information is associated with the correction method. More specifically, a combination of the information corresponding to the correction method and the information corresponding to the correction parameter is set as optical data identification information. The above-described optical data identification information will be hereinafter referred to as correction identification information. The information related to the correction method according to the present exemplary embodiment is information corresponding to the optical member of the intermediate accessory, and the information related to the parameter for the correction is information corresponding to the optical information of the intermediate accessory based on optical characteristics of the optical member. A case where the intermediate accessory is a magnification varying adapter including a magnification varying lens will be used as an example. In the case of this example, the information related to the correction method is information indicating the magnification varying lens, and the information related to the parameter for the correction is information is magnification information of the magnification varying lens.

The lens control unit 113 may be configured to store the information related to the correction method (hereinafter, referred to as method information) and the information related to the correction parameter (hereinafter, referred to as parameter information) while being associated with each other. When other information is necessary for the correction of the optical information, this information may also be stored while being associated with the method information and the parameter information.

In this manner, when the method information and the parameter information are transmitted to the lens control unit 113 via the camera control unit 205, even in a case where the intermediate accessories having different parameter information are taken into account, the correction by the already-used unit can be performed by setting the magnification information corresponding to the correction parameter again.

When the optical data identification information is used as described above, it is possible to correct the optical information of the interchangeable lens by taking into account the optical characteristics of the accessory. For example, in a case where the optical system similar to the already-available product is provided or a case where the accessory is an accessory that can be corrected by a method similar to that of the already-available product, even if the model number (ID) is not identified, it is possible to correct the optical information of the interchangeable lens.

It should be noted that, in a case where the correction identification information is used, since it is not efficient to store a correction algorithm in each unit, a unit that executes the correction is preferably decided. According to the present exemplary embodiment, a case where the unit that executes the correction is previously decided as the interchangeable lens will be described. The correction method of the interchangeable lens in a case where the correction identification information is used will also be described. The correction identification information can also be used in a case where the correction is performed by the first unit similarly as in the first and second exemplary embodiments.

Figure 11:
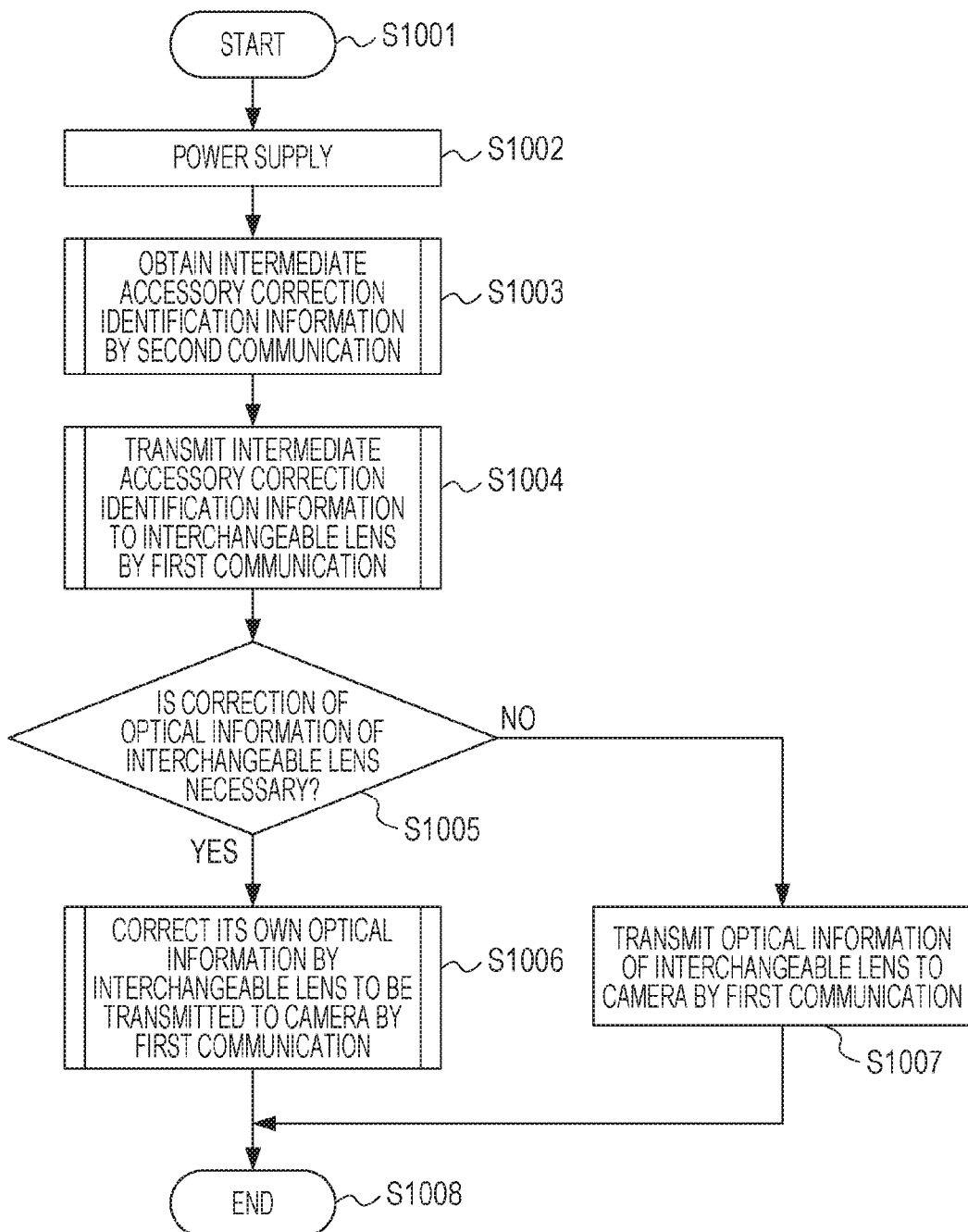
FIG. 11 is a flow chart illustrating a flow of processing for obtaining correction identification information and correction processing using the correction identification information according to a fourth exemplary embodiment.

Obtaining Processing for the Corrected Optical Information According to the Fourth Exemplary Embodiment FIG. 11 illustrates a flow of the following processing. That is, when power is supplied for the first time after the respective accessories are attached, the camera main body 20 obtains correction information from the respective accessories. The correction information is transmitted to the interchangeable lens 10, and the correction is requested. Then, the corrected optical information of the interchangeable lens 10 is obtained.

The camera main body 20 is activated in S1001, and the flow shifts to S1002.

When the flow shifts to S1002, the camera main body 20 supplies power to the interchangeable lens 10, the intermediate accessory 30, and the intermediate accessory 40 via mount contact points for power supply which are not illustrated in the drawing, and the flow shifts to S1003.

Sub-process S1003 corresponding to the initial communication processing with the accessory by the second communication is substantially similar to sub-process S304 according to the first exemplary embodiment. In S1003, the above-described correction identification information is obtained as the identification information of the intermediate accessory.

The correction attribute information of the accessory is obtained in S1003, and the flow shifts to S1004.

When the flow shifts to S1004, the camera control unit 205 transmits the intermediate accessory correction identification information obtained in S1003 to the interchangeable lens 10 and requests for the correction of the optical information. The interchangeable lens obtains the correction identification information of the intermediate accessory, and the flow shifts to S1005.

When the flow shifts to S1005, the interchangeable lens control unit 113 determines whether or not the correction of its own optical information is necessary on the basis of the intermediate accessory correction identification information. In a case where the intermediate accessory in which the correction of the optical information is necessary is attached, the flow shifts to S1006.

When the flow shifts to S1006, the interchangeable lens control unit 113 corrects its own optical information based on the intermediate accessory correction identification information and transmits the corrected optical information to the camera.

On the other hand, in S1005, in a case where the intermediate accessory is not attached or all the attached intermediate accessories are the intermediate accessories in which the correction processing of the optical information of the interchangeable lens is unnecessary, the flow shifts to S1007 since the correction processing is unnecessary.

In S1007, the interchangeable lens control unit 113 transmits its own optical information to the camera.

The transmission timing of the optical information in S1006 and S1007 may be immediately after the correction completion or a timing requested by the camera.

After the optical information is obtained in S1006 or S1007, the flow shifts to S1008, and the optical information obtaining sequence ends.

In this manner, the optical information of the interchangeable lens can be appropriately corrected on the basis of the optical information of the intermediate accessory in the camera system independently including the first communication path where the camera and the interchangeable lens can perform the communication and the second communication path where the camera and the intermediate accessory can perform the communication.

In addition, according to the first exemplary embodiment, the example in which the attribute information of the accessory includes the identification information of the accessory and the correction processing necessity/unnecessity information has been described. In contrast to this, the attribute information of the accessory may include only the correction processing necessity/unnecessity information, and the correction processing necessity/unnecessity information may be separately obtained in a case where the correction processing necessity/unnecessity information indicates that the correction is "necessary". With this configuration, as compared with the case where the correction identification information is obtained irrespective of the necessity/unnecessity indicated by the correction processing necessity/ unnecessity information, it is possible to reduce the communication amount in a case where the correction processing necessity/unnecessity information indicates that the correction is "unnecessary". In this case, similarly as in the exemplary embodiment described above, both the intermediate accessory identification information and the correction processing necessity/unnecessity information are obtained. That is, in a case where the correction processing necessity/unnecessity information indicates that the correction is "necessary" and the correction identification information is separately obtained, both the intermediate accessory identification information and the correction identification information are obtained as the information for identifying the accessory. With this configuration, it is possible to reduce the communication amount in a case where the correction processing necessity/unnecessity information indicates that the correction is "unnecessary", and also the intermediate accessory identification information can be used for another purpose irrespective of a state in which the correction processing necessity/unnecessity information indicates that the correction is "necessary" or "unnecessary".

In addition, in a case where it is determined that the lens control unit 113 does not store information corresponding to the information related to the correction method on the basis of the information related to the correction method included in the correction identification information, control may be performed in a manner that the optical information correction of the interchangeable lens 10 is not performed.

Advantages of the Fourth Exemplary Embodiment

As described above, the camera control unit 205 obtains the information related to the correction method and the information related to the correction parameter from the intermediate accessory control unit 309 and transmits these pieces of information to the lens control unit 113. With this configuration, even when the accessory is a new accessory but the correction method is already found, the lens control unit 113 can perform the correction of the optical information by taking into account the accessory.

Fifth Exemplary Embodiment

According to the present exemplary embodiment, the firmware update processing will be described in a case where the operation state received from the interchangeable lens or the intermediate accessory is the safe mode in the initial communication with the interchangeable lens or the intermediate accessory according to the first to fourth exemplary embodiments.

In a case where the operation state of either the interchangeable lens or the intermediate accessory is the safe mode, there is a possibility that control of the optical member is not to be performed or the correct optical information is not to be obtained. Thus, when it is found that the attached accessory operates in the safe mode in the initial communication, the camera main body 20 according to the present exemplary embodiment urges the user to perform the firmware update. After it is confirmed that the operation state of the attached accessory turns to a normal state, the processing in S305 and subsequent steps according to the first exemplary embodiment is performed.

Figure 13:
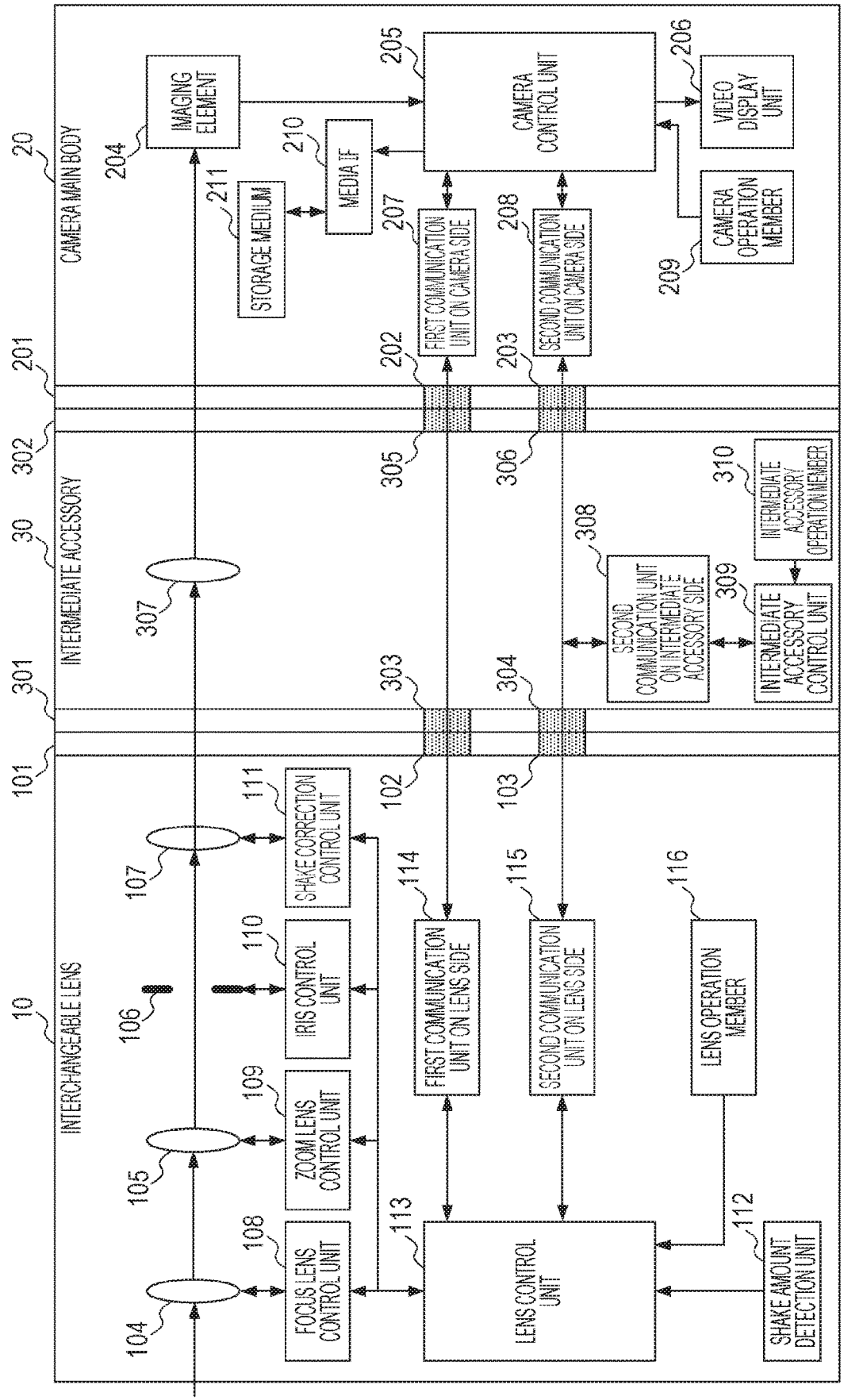
FIG. 13 is a block diagram for describing a configuration of a camera system according to a fifth exemplary embodiment.

Configuration of the Camera System According to the Fifth Exemplary Embodiment (FIG. 13)

FIG. 13 illustrates a configuration of the camera system according to the present exemplary embodiment. Since the configuration is similar to the configuration illustrated in FIGS. 1A and 1B except that the interchangeable lens 10 is directly attached to the intermediate accessory 30, detailed descriptions of the respective configurations will be omitted, but according to the present exemplary embodiment, the camera control unit 205 functions as a decision unit configured to decide the update target of the firmware. The descriptions will be provided according to the present exemplary embodiment while it is assumed that the camera system in which the single intermediate accessory is attached between the camera main body 20 and the interchangeable lens 10, but the present exemplary embodiment can also be applied to a camera system in which a plurality of intermediate accessories are attached.

Figure 14:
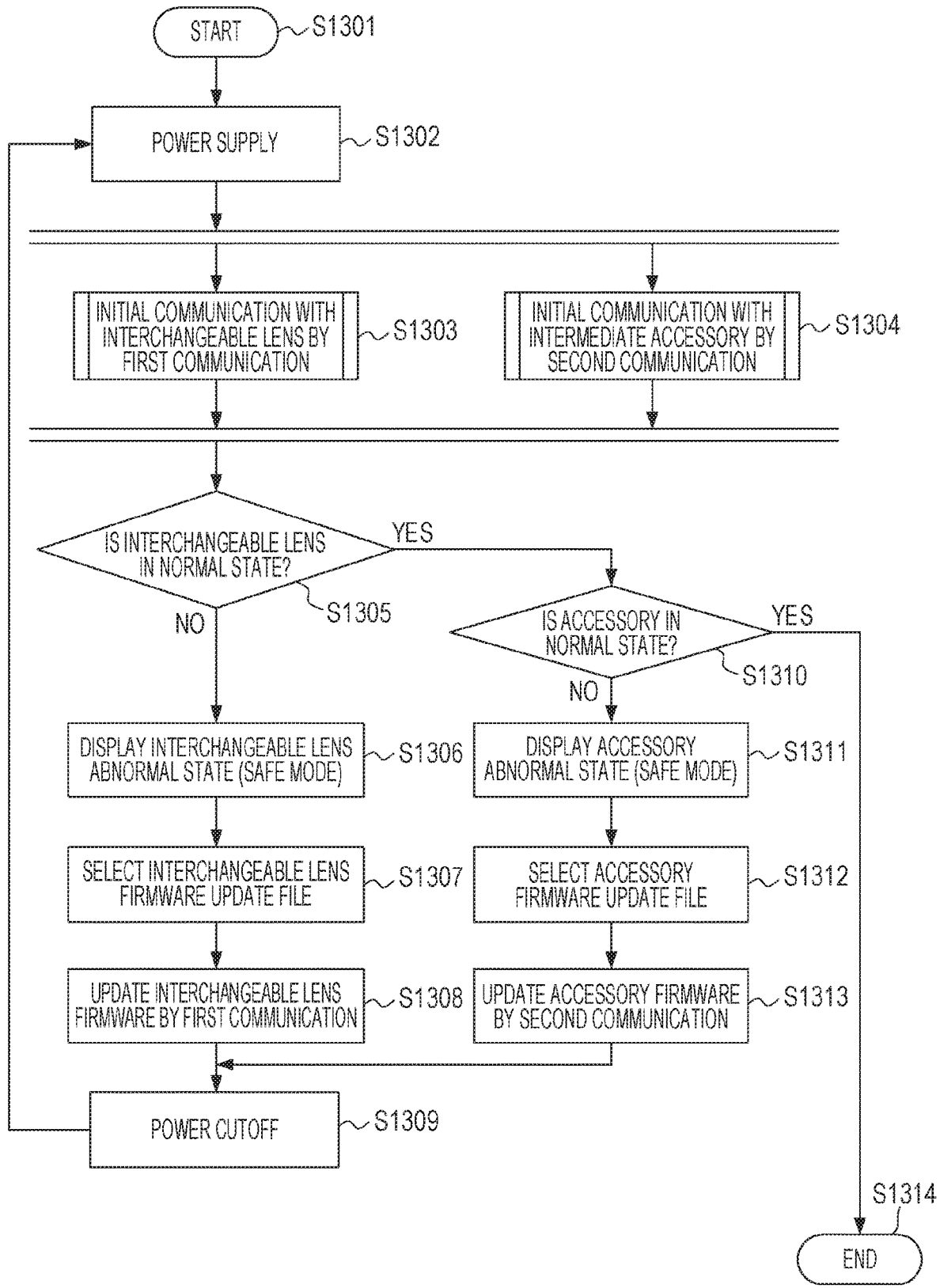
FIG. 14 is a flow chart illustrating a flow of firmware update processing according to the fifth exemplary embodiment.

Operation State Obtainment and Firmware Update Processing According to the Fifth Exemplary Embodiment (FIG. 14)

FIG. 14 illustrates a flow of processing for the camera main body 20 to urge the update of the firmware on the basis of the operation state information of the intermediate accessory 30 and the interchangeable lens 10 when power is supplied for the first time after the intermediate accessory 30 and the interchangeable lens 10 are attached.

The camera main body 20 is activated in S1301, and the flow shifts to S1302.

When the flow shifts to S1302, the camera main body 20 supplies power to the interchangeable lens 10, the intermediate accessory 30, and the intermediate accessory 40 via mount contact points for power supply which are not illustrated in the drawing. Then, the flow shifts to S1303 and S1304. It should be noted that the processing resumes from the present step in a case where the interchangeable lens or the intermediate accessory is replaced while the camera main body 20 is activated.

Since the sub-process S1303 corresponding to the initial communication processing with the interchangeable lens 10 by the first communication is a process similar to the sub-process S303 according to the first exemplary embodiment, the detailed descriptions will be omitted. Since the sub-process S1304 corresponding to the initial communication processing with the accessory by the second communication is similar to the sub-process S304 according to the first exemplary embodiment, the detailed descriptions will be omitted. In addition, since different communication paths are used in S1303 and S1304 similarly as in S303 and S304 according to the first exemplary embodiment, the processes may be performed in parallel or may also be sequentially performed.

The operation state information of the interchangeable lens 10 and the operation state information of the intermediate accessory 30 are obtained in S1303 and S1304, and the flow shifts to S1305.

In S1305, the camera control unit 205 determines whether or not the interchangeable lens is the normal state or a state in which the update of the firmware is necessary (herein, the safe mode) on the basis of the operation state information of the interchangeable lens which is obtained in S1303. The flow shifts to S1310 in the case of the normal state, and the flow shifts to S1306 in the case of the safe mode.

Figure 15A:
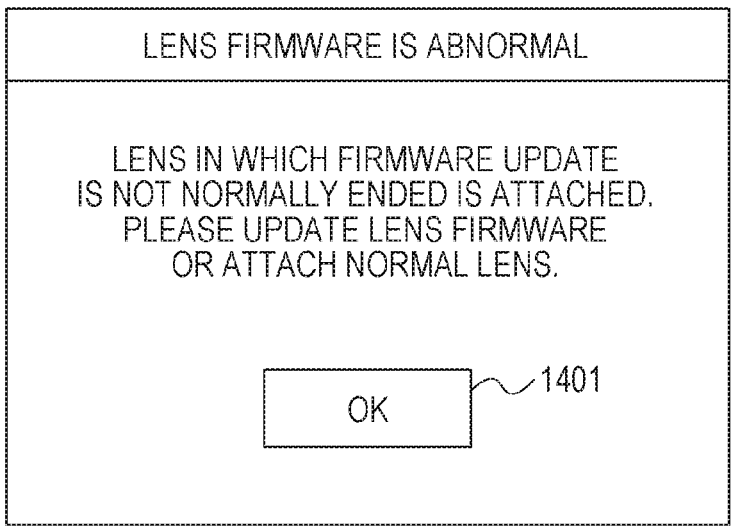
FIGS. 15A to 15F illustrate screen display examples of the firmware update processing according to the fifth exemplary embodiment.

In S1306, the camera control unit 205 performs display as illustrated in FIG. 15A on the video display unit 206, for example, and requests the user to update the firmware of the interchangeable lens 10 or attach a different interchangeable lens. When an OK button 1401 is operated, the camera control unit 205 decides the interchangeable lens 10 as the accessory of the update target of the firmware, and the flow shifts to S1307. It should be noted that, in a case where the different interchangeable lens is attached to the camera main body 20 by the replacement of the interchangeable lens, the flow returns to S1302. After the power supply, the initial communication processing (S1303 and 1304) is performed again. At this time, while the intermediate accessory 30 is attached to the camera main body 20, even in a case where only the interchangeable lens 10 is detached from the camera main body 20 to be replaced, the initial communication with the accessory using the second communication is also performed (S1304).

Figure 15B:
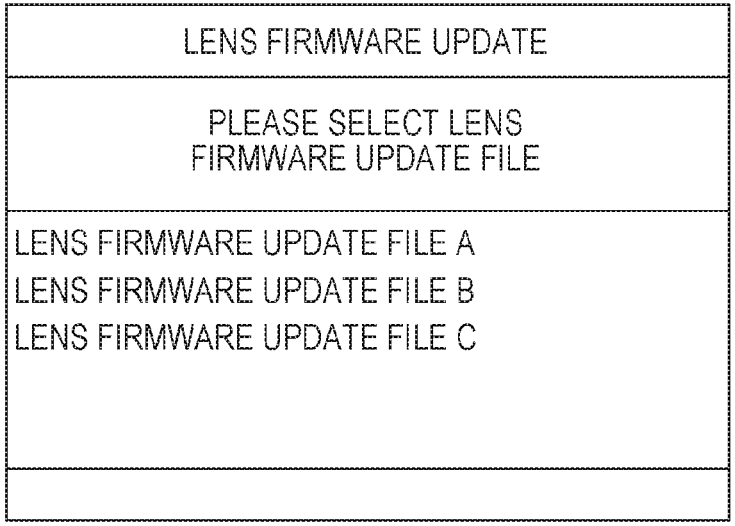
Figure 15C:

In S1307, the camera control unit 205 selects a firmware update file (hereinafter, referred to as an update file) to be applied to the interchangeable lens 10. In a case where a plurality of applicable update files exist, the update file to be applied is preferably selected on the basis of the selection by the user. For example, in a case where a plurality of update files that can be applied to the interchangeable lens 10 are recorded in the recording medium 211, as illustrated in FIG. 15B, a list of the applicable update files is displayed on the video display unit 206, and the user is requested to select the update file to be applied. When the update file is selected via an acceptance unit configured to accept a selection instruction based on the operation by the user, the camera control unit 205 sets the selected update file as the update file to be applied, and the flow shifts to S1308. At this time, the camera control unit 205 can identify the update file that is matched with the identification information of the interchangeable lens 10 as the update file that can be applied to the interchangeable lens 10 by referring to the identification information of the applicable interchangeable lens which is described in the update file. On the other hand, in a case where the update file that can be applied to the interchangeable lens 10 is not recorded in the recording medium 211, for example, the display illustrated in FIG. 15C is performed, and a request may be performed so as to record the firmware update file that can be applied to the interchangeable lens 10 in the recording medium 211. It should be noted that the acceptance unit refers to a unit configured to accept the operation signal from an operation member such as a touch panel or an operation button, and the camera control unit 205 functions as the acceptance unit according to the present exemplary embodiment. Hereinafter, all of the selection instructions from the user are set to be input to the camera main body 20 via the acceptance unit.

In S1308, the camera control unit 205 performs the update of the firmware of the interchangeable lens 10 by using the first communication. The camera control unit 205 transmits the firmware update data to the interchangeable lens 10 from the update file selected in S1307, and the flow shifts to S1309. It should be noted that the transmission of the firmware update data is performed via the first communication. According to this, the firmware update data can be transmitted from the camera main body 20 to the interchangeable lens 10 irrespective of whether the intermediate accessory 30 is in the normal state or the safe mode.

In S1309, the camera main body 20 cuts off the power supply of the interchangeable lens 10 and the intermediate accessory 30 via the mount contact points for power supply which are not illustrated in the drawings. Then, the flow shifts to the S1302, and the attribute information of the interchangeable lens 10, the intermediate accessory 30, and the intermediate accessory 40 are obtained again.

In these steps between S1305 and S1309, in a case where the update of the firmware of the interchangeable lens 10 is interrupted (that is, the safe mode), the firmware of the interchangeable lens 10 is updated irrespective of whether or not the intermediate accessory 30 is in the normal state.

In S1310, the camera control unit 205 determines whether or not the intermediate accessory is in the normal state or the state in which the update of the firmware is necessary (herein, the safe mode) on the basis of the operation state information of the intermediate accessory 30 which is obtained in S1304. The flow shifts to S1311 in a case where the intermediate accessory 30 is in the safe mode. The flow shifts to S1314 in a case where both are in the normal state, and the present firmware update processing is ended.

Figure 15D:

In S1311, the camera control unit 205 performs display as illustrated in FIG. 15D on the video display unit 206, for example, and requests the user to update the firmware of the intermediate accessory or attach a different intermediate accessory. When an OK button 1402 is operated, the flow shifts to S1312.

Similarly as in S1306, in a case where the replacement of the intermediate accessory is performed here and a different intermediate accessory is attached, the flow returns to S1302, and after the power supply, the initial communication processing is performed again (S1303, 1304).

Figure 15E:

In S1312, the camera control unit 205 selects the update file to be applied to the intermediate accessory 30. In a case where a plurality of applicable update files exist, the update file to be applied is preferably selected on the basis of the selection by the user. For example, in a case where the plurality of update files that can be applied to the interchangeable lens 10 are recorded in the recording medium 211, as illustrated in FIG. 15E, the list of the applicable update files is displayed on the video display unit 206, and the user is requested to select the update file to be applied. When the update file is selected, the camera control unit 205 sets the selected update file as the update file to be applied, and the flow shifts to S1313. At this time, the camera control unit 205 refers to the identification information of the applicable intermediate accessory described in the update file and can identify the update file matched with the identification information of the intermediate accessory 30 as the update file that can be applied to the intermediate accessory 30.

In a case where the update file that can be applied to the intermediate accessory 30 is not recorded in the recording medium 211, for example, display as illustrated in FIG. 15C may be performed, and a request may be performed so as to record the firmware update file that can be applied to the intermediate accessory 30 in the recording medium 211.

In S1313, the camera control unit 205 performs the update of the firmware of the intermediate accessory 30 by using the first communication. The camera control unit 205 transmits the firmware update data to the intermediate accessory 30 from the update file selected in S1312, and the flow shifts to S1309. It should be noted that the transmission of the firmware update data is performed via the second communication.

In these steps S1310 to S1309, the firmware of the intermediate accessory 30 is updated in a case where the update of the firmware of the intermediate accessory 30 is in an interrupted state (that is, the safe mode).

As described above, in a case where the interchangeable lens 10 or the operation state of the intermediate accessory 30 is in the safe mode, it is possible to urge the user to perform the firmware update on the basis of the flow chart illustrated in FIG. 14.

As illustrated in FIG. 14, according to the present exemplary embodiment, both the interchangeable lens 10 and the intermediate accessory 30 are in the safe mode, and the update of the firmware of the interchangeable lens 10 is prioritized. In a case where the intermediate accessory 30 is the intermediate accessory in which the optical correction is unnecessary, even when the intermediate accessory 30 operates in the safe mode, the capturing can be performed by using the camera system including the intermediate accessory 30. On the other hand, when the interchangeable lens 10 operates in the safe mode, an influence on the capturing is large since the drive of the focus lens 104, the zoom lens 105, the iris 106, and the shake correction lens 107 is not to be controlled. Thus, according to the present exemplary embodiment, when the operation state of the interchangeable lens 10 is the safe mode, irrespective of whether or not the operation state of the intermediate accessory 30 is the safe mode, the interchangeable lens 10 is set as the update target of the firmware to perform the update of the firmware. According to this, even in a case where the intermediate accessory 30 operates in the safe mode, the capturing can be performed as usual depending on optical characteristic of the intermediate accessory 30.

In the flow chart illustrated in FIG. 14, in a case where the operation state of the intermediate accessory 30 is the safe mode, the descriptions of the case where the update of the firmware is performed have been provided. However, in a case where the camera control unit 205 can determine that the communication related to the correction of the optical information with the intermediate accessory 30 is unnecessary, the update of the firmware may skipped to end the update processing illustrated in FIG. 14. The case where the communication related to the correction of the optical information is unnecessary includes, for example, a case where the intermediate accessory in the safe mode does not include the optical member or a case where the intermediate accessory is the static intermediate accessory and the camera main body 20 or the interchangeable lens 10 includes the optical information of the intermediate accessory. In the case of the static intermediate accessory, the camera main body 20 or the interchangeable lens 10 can identify the optical information used for the correction from the identification information.

It should be noted that, in a case where a plurality of intermediate accessories are attached between the interchangeable lens 10 and the camera main body 20 as in the first exemplary embodiment, the intermediate accessory in the safe mode state may be identified in S1310, and the update target of the firmware for only the intermediate accessory in the safe mode state may be used.

Furthermore, in a case where the plurality of intermediate accessories are in the safe mode, the update of the firmware may be prohibited. When the firmware update itself is prohibited, a case where it is difficult to find which one of the intermediate accessories the firmware can be applied to does not occur, and the operation by the user can be facilitated. In addition, in a case where the update of the firmware is performed on the basis of the instruction from the user (in the flow illustrated in FIG. 16), it is possible to avoid erroneous update of the firmware of the unintended one of the intermediate accessories. In a case where the plurality of intermediate accessories are in the safe mode, a list of the update files that can be applied to only one of the intermediate accessories may be displayed. In addition, a list of the update files that can be applied to any of the intermediate accessories may be displayed, and a list of the update files that can be applied to the respective intermediate accessories may be displayed.

In a case where the plurality of intermediate accessories are in the safe mode and the firmware of the plurality of intermediate accessories is sequentially updated, the update of the firmware may be performed in turn from the intermediate accessory on a side closer to the camera main body 20. In addition, in a case where the intermediate accessory in which the communication related to the correction of the optical information is unnecessary can be identified, the update of the firmware may be performed while the intermediate accessory in which the above-described communication is necessary is prioritized.

Firmware Update Processing Based on the Selection by the User According to the Fifth Exemplary Embodiment (FIG. 15)

Figure 15F:
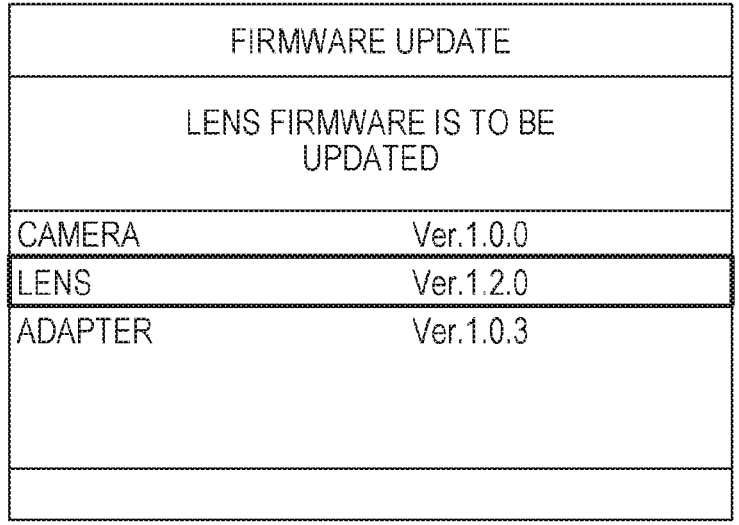

The update of the firmware of the interchangeable lens and the intermediate accessory can be performed even when the state is not the safe mode state. The camera control unit 205 performs display as illustrated in FIG. 15F on the video display unit 206, for example, and requests the user to select the update target of the firmware. The camera control unit 205 decides and sets the update target of the firmware on the basis of the selection by the user.

Figure 16:
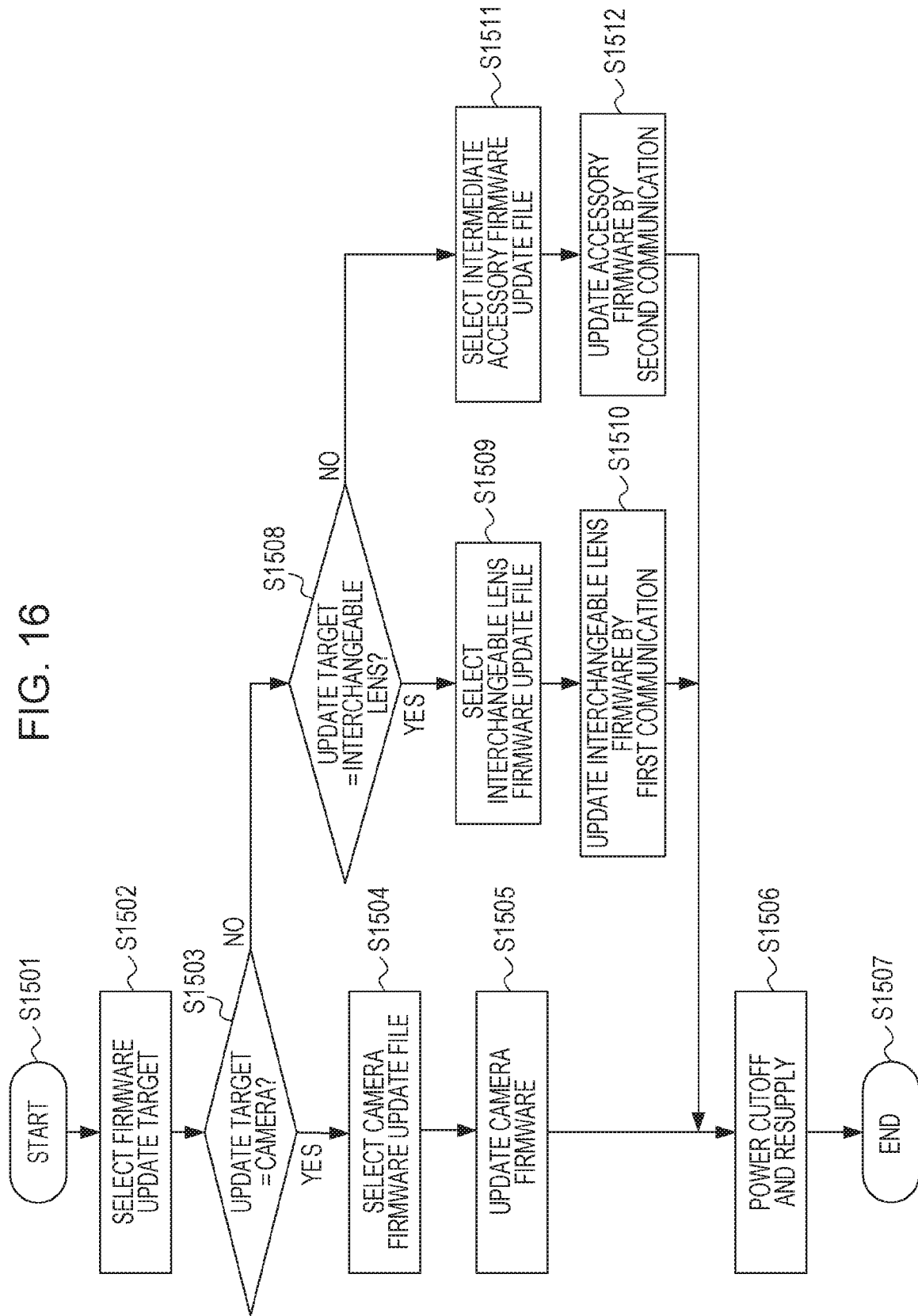
FIG. 16 is a flow chart illustrating a flow of firmware update processing based on a user selection according to the fifth exemplary embodiment.

FIG. 16 is a flow chart in a case where the update of the firmware is performed on the basis of the selection by the user.

The present flow is started in response to the operation for instructing the update of the firmware by the user (S1501).

In S1502, the camera control unit 205 selects the update target selected by the user via the acceptance unit as the update target of the firmware, and the flow shifts to S1503.

In S1503, it is determined whether or not the selected update target is the camera main body 20. In a case where the selected update target is the camera main body 20, the flow shifts to S1504. In a case where the selected update target is not the camera main body 20, the flow shifts to S1508.

In S1504, the update file of the firmware to be applied to the camera main body 20 is selected. The camera control unit 205 selects the update file to be applied to the camera main body 20. In a case where a plurality of applicable update files exists as in S1307 and S1312, the update file to be applied is preferably selected on the basis of the selection by the user.

In S1505, the camera control unit 205 performs the update of the firmware of the camera main body 20. The camera control unit 205 reads the firmware update data from the update file selected in S1504 and updates the firmware. Then, the flow shifts to S1506. In S1506, similarly as in S1309, the power supply is cut off, and the power is supplied again (reactivation operation). Then, the flow shifts to S1507, and the processing is ended.

On the other hand, when it is determined in S1503 that the selected update target is not the camera main body 20 and the flow shifts to S1508, it is determined in S1508 whether or not the selected update target is the interchangeable lens 10. In a case where the selected update target is the interchangeable lens 10, the flow shifts to S1509. In a case where the selected update target is not the interchangeable lens 10, the flow shifts to S1508.

In S1509, the update file to be applied to the interchangeable lens 10 is selected. Since the processing in the present step is the same as the processing performed in S1307, the descriptions thereof will be omitted.

In S1510, the camera control unit 205 performs the update of the firmware of the interchangeable lens 10 by using the first communication. Since the processing in the present step is the same as the processing performed in S1308, the descriptions thereof will be omitted. When the update of the firmware is ended, the flow shifts to S1506.

When it is determined in S1508 that the selected update target is not the interchangeable lens 10 and the flow shifts to S1511, the camera control unit 205 selects the intermediate accessory 30 as the update target to select the update file to be applied to the intermediate accessory. Since the processing in the present step is the same as the processing performed in S1312, the descriptions thereof will be omitted.

In S1512, the camera control unit 205 performs the update of the firmware of the intermediate accessory 30 by using the second communication. Since the processing in the present step is the same as the processing performed in S1313, the descriptions thereof will be omitted. When the update of the firmware is ended, the flow shifts to S1506.

Advantages of the Fifth Exemplary Embodiment

As described above, according to the present exemplary embodiment, the firmware update processing of the interchangeable lens is implemented by the first communication, and the firmware update processing of the intermediate accessory is implemented by the second communication. Thus, even when the intermediate accessory is in the safe mode state, the firmware update processing of the interchangeable lens can be normally performed, and also, even when the interchangeable lens is in the safe mode, the firmware update processing of the intermediate accessory can be normally performed.

Other Exemplary Embodiments

It should be noted that, according to the above-described exemplary embodiment, the descriptions have been made while the first accessory is set as the accessory that holds the optical information of all the other accessories among the accessories related to the correction. However, the first accessory may be the accessory that has the most number of pieces of mutual optical information among the accessories related to the correction. That is, the accessory that does not have the optical information may exist. In this case, the insufficient optical information may be obtained from another unit.

In addition, in the initial communication according to the above-described exemplary embodiment, the lens control unit 113 transmits the identification information of the interchangeable lens 10 in S404 and S520. Herein, for example, the identification information transmitted in S520 may be identification information indicating that this is not an intermediate accessory.

Moreover, in the initial communication of FIG. 5 according to the above-described exemplary embodiment, the respective accessories transmit plural pieces of information to the camera control unit 205 as the attribute information, but only necessary information may be transmitted. In this case, the camera specifies the necessary information and transmits information requests to the respective accessories.

Furthermore, according to the above-described exemplary embodiment, the case where the number of intermediate accessories is two has been described. In a case where the number of intermediate accessories is three or more, the intermediate accessory that has all the optical information of the other intermediate accessories or the most number of pieces of optical information among the plurality of intermediate accessories is set as the first intermediate accessory.

According to the second exemplary embodiment, the dynamic accessory may perform the correction of the optical information of the interchangeable lens 10. In this case, the dynamic accessory may obtain the optical information of the other accessory in advance. In a case where the dynamic accessory corrects the optical information of the interchangeable lens 10, the corrected optical information is transmitted to the camera main body 20.

According to the second exemplary embodiment, in a case where a plurality of first accessories are used, the dynamic accessory may perform the correction of the optical information of the interchangeable lens 10.

According to the third exemplary embodiment, the case where the correction of the optical information of the interchangeable lens 10 is performed in the camera main body 20 has been described. In contrast to this, the correction of the optical information may be performed in the interchangeable lens 10. In this case, instead of S906 of FIG. 9, the camera control unit 205 transmits a request for performing the correction of the optical information of the interchangeable lens 10 to the lens control unit 113. At this time, in a case where the optical information of the intermediate accessory in which the correction is necessary is insufficient, the interchangeable lens 10 may obtain the optical information of the intermediate accessory from the camera main body 20 or the intermediate accessory if necessary.

According to the fourth exemplary embodiment, the example has been described in which the camera control unit 205 obtains the information related to the correction method and the information related to the correction parameter from the intermediate accessory control unit 309 and transmits these pieces of information to the lens control unit 113. Herein, in a case where the intermediate accessory 30 is a dynamic intermediate accessory described according to the second exemplary embodiment and the information related to the correction parameter may change, the information related to the correction parameter may be obtained again in accordance with the detection of the change. That is, in a case where it is detected that the operation member of the intermediate accessory 30 is operated, the camera control unit 205 may obtains the information related to the correction parameter from the intermediate accessory control unit 309 and transmit the information to the lens control unit 113.

In addition, according to the first exemplary embodiment, the case has been described where the clock synchronous communication is performed as the first communication method, but the asynchronous communication may also be used. The asynchronous communication will be described with reference to FIG. 17.

Figure 17:
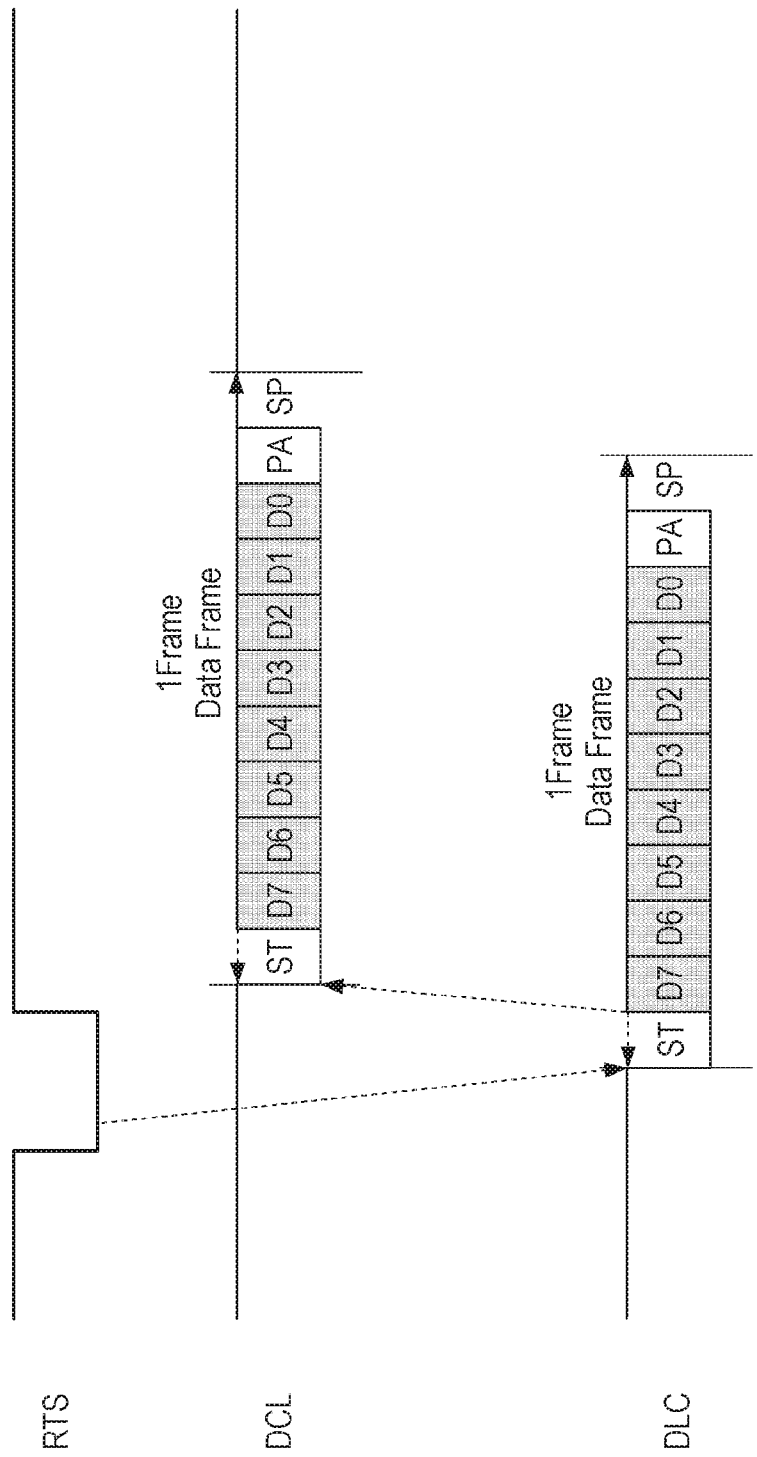
FIG. 17 is an explanatory diagram for describing a modified example of the first communication according to the first exemplary embodiment.

It should be noted that FIGS. 2A and 2B exemplify the case where the three-line clock synchronous communication is performed. Instead of this, even in a case where the three-line asynchronous communication realized by similarly using three lines of a communication channel 1 is adopted, it is possible to realize similar advantages. FIG. 17 illustrates a signal waveform in the three-line asynchronous communication. In the case of the three-line asynchronous communication, instead of the above-described clock communication line (LCLK), a RTS communication line (RTS) is included. The RTS communication line is a signal line for transmitting signals for controlling timings of a communication based on a camera-lens communication line (DCL) and a communication based on the first lens-camera communication line (DLC) from the camera control unit 205 to the shake correction control unit 111. For example, this is used for notifications such as a transmission request (transmission instruction) of lens data from the camera control unit 205 to the shake correction control unit 1111 and a switching request (switching instruction) of the communication processing which will be described below. The notification in a transmission request channel is performed by switching a signal level (voltage level) in the transmission request channel between High (first level) and Low (second level). In the following explanation, a signal supplied to the RTS communication line will be referred to as a transmission request signal RTS. The transmission request signal RTS is transmitted from the camera control unit 205 serving as a communication master to the shake correction control unit 111 serving as a communication slave. When the shake correction control unit 111 receives the transmission request RTS, as illustrated in FIG. 16, to notify the camera control unit 205 of transmission start of one frame of the lens data signal DLC, the signal level of the lens data signal DLC is set as Low for a 1-bit period. This 1-bit period is referred to as a start bit ST indicating the start of the one frame. That is, the data frame is started from the start bit ST. The start bit ST is arranged in an initial bit for each frame of the lens data signal DLC. Subsequently, the shake correction control unit 111 transmits 1-byte lens data for an 8-bit period from the following second bit to the ninth bit. A bit arrangement of the data is set as an MSB first format that starts from most significant data D7 to be followed by data D6 and data D5 in sequence and ends by least significant data D0. Then, the shake correction control unit 111 adds 1-bit parity information PA to the tenth bit and sets the signal level of the lens data signal DLC for a period of a stop bit SP indicating the end of one frame as High. According to this, the data frame period that has started from the start bit ST is ended.

It should be noted that the above-described respective exemplary embodiments may be appropriately combined with each other.

Embodiments of the present invention can also be realized while a program that realizes one or more functions according to the above-described exemplary embodiment is supplied to a system or an apparatus via a network or a storage medium, and one or more processors in a computer of the system or the apparatus read the program to execute processing. Furthermore, embodiments of the present invention can be realized by a circuit that realizes the one or more functions (for example, an application specific integrated circuit (ASIC)).

The exemplary embodiments of the present invention have been described above, but the present invention is not limited to these exemplary embodiments, and various modifications and alterations can be made within the scope of the disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-123744, filed Jun. 28, 2018, which is hereby incorporated by reference herein in its entirety.

What is claimed is:

1. An imaging apparatus to which an interchangeable lens and an intermediate accessory, which is attachable between the interchangeable lens and the imaging apparatus, are attachable, the imaging apparatus comprising:
at least one processor which functions as:
a first communication control unit configured to control a first communication via a first communication path where it is possible to mutually communicate with the interchangeable lens;
a second communication control unit configured to control a second communication via a second communication path where it is possible to mutually communicate with the intermediate accessory; and
a setting unit configured to set an update target of firmware on the basis of first information related to the interchangeable lens which is obtained via the first communication and second information related to the intermediate accessory which is obtained via the second communication from the interchangeable lens and the intermediate accessory,
wherein,
in a case where the first information includes information indicating that update of the firmware of the interchangeable lens is in an interrupted state, irrespective of whether or not the second information includes information indicating that update of the firmware of the intermediate accessory is in an interrupted state, the setting unit sets the interchangeable lens as the update target,
in a case where the setting unit sets the interchangeable lens as the update target, the first communication control unit transmits update data to be applied to the interchangeable lens via the first communication path to the interchangeable lens, and
in a case where the setting unit sets the intermediate accessory as the update target, the second communication control unit transmits update data to be applied to the intermediate accessory via the second communication path to the interchangeable lens.

2. The imaging apparatus according to claim 1, wherein the setting unit sets the intermediate accessory as the update target in a case where the first information does not include the information indicating that the update of the firmware of the interchangeable lens is in the interrupted state and also the second information includes the information indicating that the update of the firmware of the intermediate accessory is in the interrupted state.

3. The imaging apparatus according to claim 2,
wherein, in a case where the first information includes the information indicating that the update of the firmware of the interchangeable lens is in the interrupted state and also the second information includes the information indicating that the update of the firmware of the intermediate accessory is in the interrupted state, the setting unit sets the interchangeable lens as the update target, and sets the intermediate accessory as the update target after it is confirmed that the update of the firmware of the interchangeable lens has been completed.

4. The imaging apparatus according to claim 1,
wherein, in a case where the first information includes the information indicating that the update of the firmware of the interchangeable lens is in the interrupted state and also the second information includes the information indicating that the update of the firmware of the intermediate accessory is in the interrupted state, the setting unit sets the interchangeable lens as the update target, and sets the intermediate accessory as the update target after it is confirmed that the update of the firmware of the interchangeable lens has been completed.

5. The imaging apparatus according to claim 1,
wherein the at least one processor further functions as:
an acceptance unit configured to accept a selection of the update target by a user, and
wherein, in a case where the first information does not include the information indicating that the update of the firmware of the interchangeable lens is in the interrupted state and also the second information does not include the information indicating that the update of the firmware of the intermediate accessory is in the interrupted state, the setting unit sets an accessory selected by the user via the acceptance unit as the update target.

6. The imaging apparatus according to claim 1,
wherein the first information includes the information indicating whether or not the update of the firmware of the interchangeable lens is in the interrupted state, and
wherein the second information includes the information indicating whether or not the update of the firmware of the intermediate accessory is in the interrupted state.

7. The imaging apparatus according to claim 1,
wherein the first communication control unit obtains the first information as a response to first instruction information transmitted by the first communication control unit to the interchangeable lens, and
wherein the second communication control unit obtains the second information as a response to second instruction information transmitted by the second communication control unit to the interchangeable lens.

8. The imaging apparatus according to claim 1,
wherein the first information includes identification information of the interchangeable lens, and
wherein the second information includes identification information of the intermediate accessory and information indicating whether or not a correction of optical information of the interchangeable lens is necessary.

9. The imaging apparatus according to claim 1,
wherein, in a case where the second information includes the information indicating that the update of the firmware of the intermediate accessory is in the interrupted state, the setting unit decides whether or not the intermediate accessory is set as the update target on a basis of at least one of identification information of the intermediate accessory and information indicating whether or not a correction of optical information of the interchangeable lens is necessary.

10. The imaging apparatus according to claim 1,
wherein, in a case where the first information does not include the information indicating that the update of the firmware of the interchangeable lens is in the interrupted state, the second information does not include the information indicating that the update of the firmware of the intermediate accessory is in the interrupted state, and also a plurality of intermediate accessories are attached between the imaging apparatus and the interchangeable lens, the setting unit does not set the intermediate accessory as the update target.

11. An interchangeable lens attachable to an intermediate accessory attached to an imaging apparatus, the interchangeable lens comprising:
at least one processor which functions as:
a first communication control unit configured to control a first communication via a first communication path where it is possible to mutually communicate with the imaging apparatus;
a second communication control unit configured to control a second communication via a second communication path where it is possible to mutually communicate with the imaging apparatus via the intermediate accessory; and
a storage unit configured to store identification information of the interchangeable lens and optical information of the interchangeable lens,
wherein the first communication control unit transmits information including the identification information of the interchangeable lens and information indicating whether an update of the firmware of the interchangeable lens is in an interrupted state or not to the imaging apparatus as a response to first instruction information obtained from the imaging apparatus.

12. An intermediate accessory attached between an imaging apparatus and an interchangeable lens, the intermediate accessory comprising:
at least one processor which functions as:
a communication control unit configured to control a communication via a communication path where it is possible to mutually communicate with the imaging apparatus; and
a storage unit configured to store identification information and optical information of the intermediate accessory,
wherein the communication control unit transmits the identification information of the intermediate accessory and information indicating whether an update of the firmware of the intermediate accessory is in an interrupted state or not to the imaging apparatus by the communication as a response to first instruction information obtained from the imaging apparatus.

13. A control method for an imaging apparatus to which an interchangeable lens and an intermediate accessory, which is attached between the interchangeable lens and the imaging apparatus, are attachable, the control method comprising:
controlling a first communication via a first communication path where it is possible to mutually communicate with the interchangeable lens;
controlling a second communication via a second communication path where it is possible to mutually communicate with the intermediate accessory;
setting an update target of firmware on the basis of first information related to the interchangeable lens which is obtained via the first communication and second information related to the intermediate accessory which is obtained via the second communication from the interchangeable lens and the intermediate accessory;

transmitting update data to be applied to the interchangeable lens to the interchangeable lens via the first communication path when the interchangeable lens is set as the update target; and transmitting update data to be applied to the intermediate accessory to the interchangeable lens via the second communication path when the intermediate accessory is set as the update target, wherein, in a case where the first information includes information indicating that update of the firmware of the interchangeable lens is in an interrupted state, irrespective of whether or not the second information includes information indicating that update of the firmware of the intermediate accessory is in an interrupted state, the interchangeable lens is set as the update target.

14. A control method for an interchangeable lens attachable to an intermediate accessory attached to an imaging apparatus, the control method comprising:

controlling a first communication via a first communication path where it is possible to mutually communicate with the imaging apparatus;

controlling a second communication via a second communication path where it is possible to mutually communicate with the imaging apparatus via the intermediate accessory; and transmitting information including identification information of the interchangeable lens and information indicating whether an update of the firmware of the interchangeable lens is in an interrupted state or not to the imaging apparatus by the first communication as a response to first instruction information obtained from the imaging apparatus.

15. A control method for an intermediate accessory which is attached between an imaging apparatus and an interchangeable lens and is configured to control a communication via a communication path where it is possible to mutually communicate with the imaging apparatus, the control method comprising:

receiving first instruction information obtained from the imaging apparatus; and transmitting identification information of the intermediate accessory and information indicating whether an update of the firmware of the intermediate accessory is in an interrupted state or not to the imaging apparatus by the communication as a response to the first instruction information.

16. The interchangeable lens according to claim 11, wherein the second communication path is configured to enable the intermediate accessory and the imaging apparatus to communicate with each other.

17. The intermediate accessory according to claim 12, further comprising another communication path via which the interchangeable lens and the imaging apparatus are able to communicate with each other.

18. The intermediate accessory according to claim 17, wherein the another communication path is a path where first information is transmitted from the interchangeable lens to the imaging apparatus, and wherein the first information includes identification information of the interchangeable lens and information indicating whether an update of the firmware of the interchangeable lens is in an interrupted state or not.

* * * * *